(12) United States Patent
Mozzami et al.

(10) Patent No.: US 11,676,187 B2
(45) Date of Patent: Jun. 13, 2023

(54) METHOD, SYSTEM, AND DEVICE TO INTELLIGENTLY CREATE EFFECTIVE LISTINGS

(71) Applicant: Mercari, Inc., Palo Alto, CA (US)

(72) Inventors: Mohammad-Mahdi Mozzami, San Jose, CA (US); Manikandan Sankar, Hayward, CA (US); Laura Furman, San Francisco, CA (US); Dhruv Mehrotra, Mountain View, CA (US)

(73) Assignee: MERCARI, INC., Palo Alto, CA (US)

( * ) Notice: Subject to any disclaimer, the term of this patent is extended or adjusted under 35 U.S.C. 154(b) by 334 days.

(21) Appl. No.: 16/875,051

(22) Filed: May 15, 2020

(65) Prior Publication Data
US 2020/0380584 A1    Dec. 3, 2020

Related U.S. Application Data

(60) Provisional application No. 62/854,420, filed on May 30, 2019.

(51) Int. Cl.
*G06Q 30/0601*    (2023.01)
*G06F 18/22*    (2023.01)
*G06V 10/764*    (2022.01)

(52) U.S. Cl.
CPC ......... *G06Q 30/0605* (2013.01); *G06F 18/22* (2023.01); *G06Q 30/0633* (2013.01); *G06V 10/764* (2022.01)

(58) Field of Classification Search
CPC .......... G06Q 30/0633; G06Q 30/0605; G06Q 30/0601–0645

USPC ....................... 705/26.8, 26.1–27.2
See application file for complete search history.

(56) References Cited

U.S. PATENT DOCUMENTS

| 2004/0064201 | A1* | 4/2004 | Aragones | G05B 13/024 700/36 |
| 2007/0239999 | A1* | 10/2007 | Honig | G06N 7/005 713/194 |
| 2012/0054113 | A1* | 3/2012 | Jayaraman | G06Q 99/00 705/306 |
| 2019/0149725 | A1* | 5/2019 | Adato | G06V 20/17 348/158 |

(Continued)

OTHER PUBLICATIONS

Nabeel Abdul Latheef, Shaping up E-Commerce with Machine Learning, Towards Data Science, Nov. 18, 2017 (Year: 2017).*

*Primary Examiner* — Allison G Wood
*Assistant Examiner* — Anna Mae Mitros
(74) *Attorney, Agent, or Firm* — Sterne, Kessler, Goldstein & Fox, P.L.L.C.

(57) ABSTRACT

Disclosed herein are system, method, and computer program product embodiments for the prediction of listing attributes for a for sale object (FSO). Data analyzed with respect to historical listings in a database is compared to attributes of the FSO using machine learning (ML) and artificial intelligence (AI), in order for the user to select a category related to the FSO, and for a listing generation module to generate a ultimately reduced set of listings related to the FSO, where the ultimately reduced set is used to predict a price for the FSO based on the selected category, and generate a listing for the FSO, wherein a listing for the FSO is monitored, and information from the monitoring is used as machine learning feedback to train and enhance predictions.

19 Claims, 15 Drawing Sheets

(56) References Cited

U.S. PATENT DOCUMENTS

2019/0294879 A1* 9/2019 Tibau-Puig ............ G06V 20/20
2019/0311301 A1* 10/2019 Pyati ..................... G06F 16/901

* cited by examiner

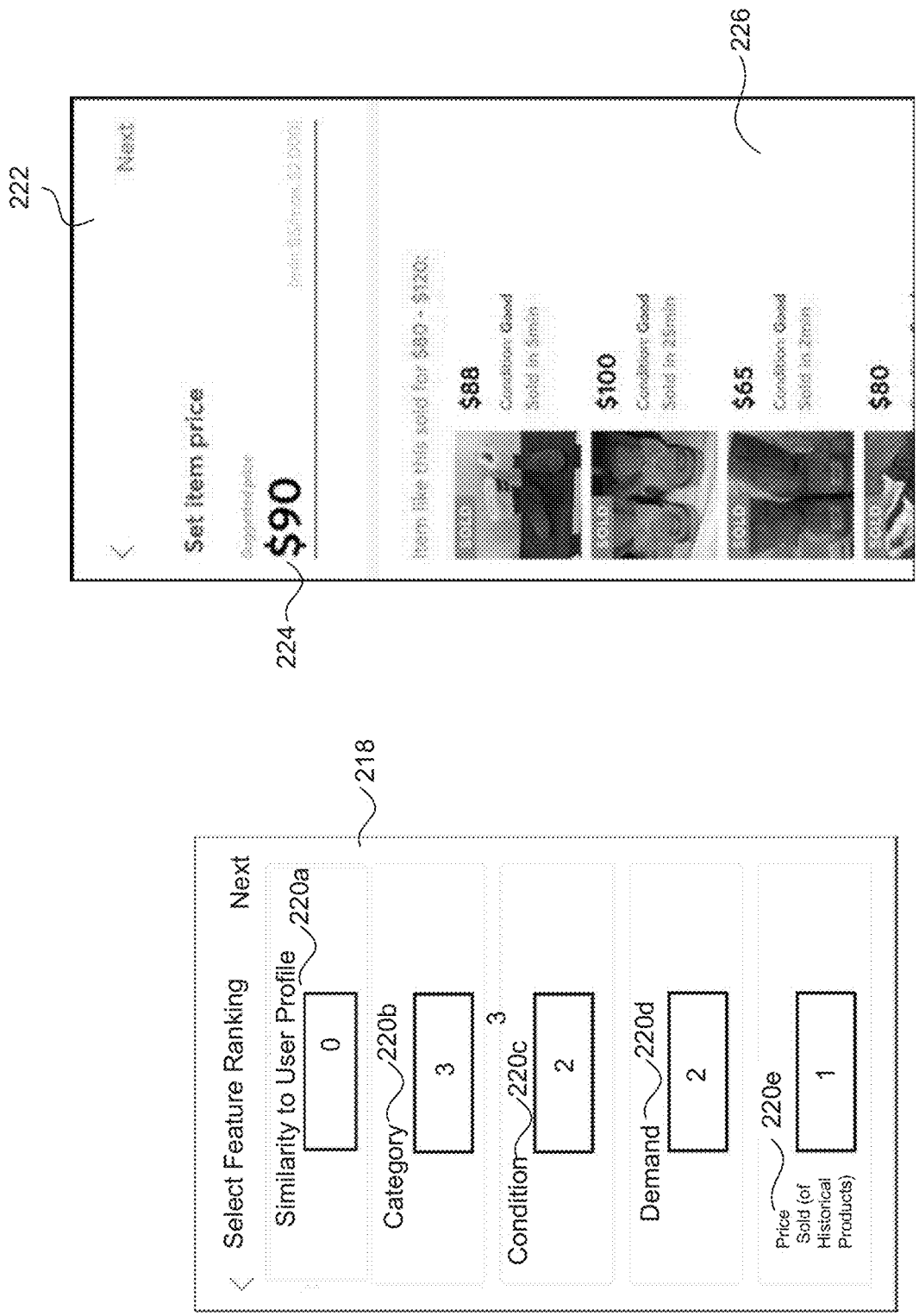

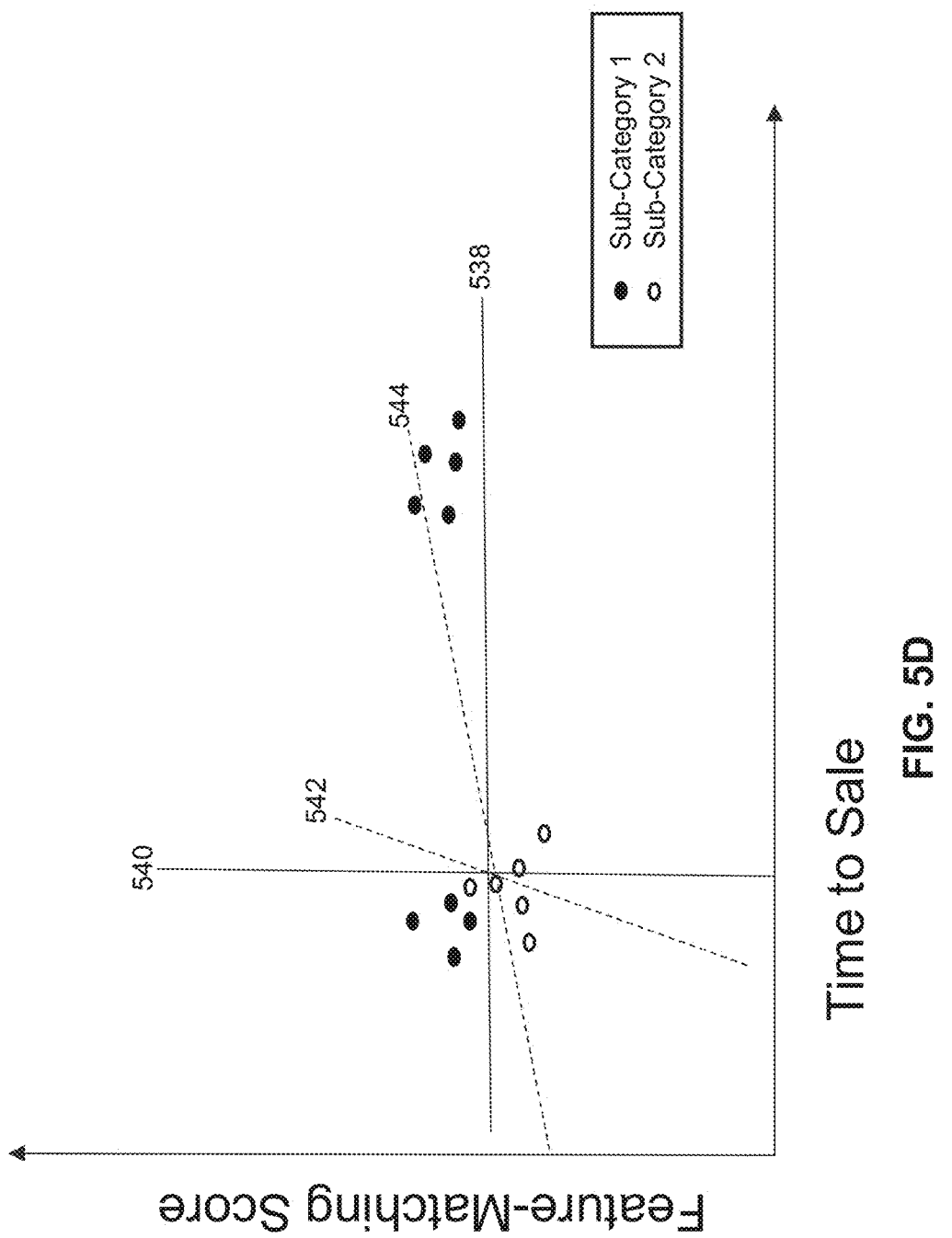

US 11,676,187 B2

METHOD, SYSTEM, AND DEVICE TO INTELLIGENTLY CREATE EFFECTIVE LISTINGS

CROSS-REFERENCE TO RELATED APPLICATIONS

This application is a non-provisional of and claims the benefit of U.S. provisional Application 62/854,420, filed May 30, 2019, which is incorporated by reference herein.

BACKGROUND

A number of ecommerce sites exist where users can sell their unwanted items, such as MERCARI, EBAY, AMAZON, YAHOO, POSHMARK, LETGO, CRAIGSLIST, etc. In order to sell on these sites, users must manually create listings for offering their items for sale. The quality of such listings can vary greatly, and may depend on a number of factors, such as the user's experience creating listings, the information the user has on the item (such as make, model, brand, size, color, features, condition, age, etc.), the user's photo taking skills, whether the user is rushed when creating the listing, whether this is the first time the user has ever tried to sell an item of this type, whether the item is the user's or is being sold for a friend or family member, etc. Since a well-constructed listing (having accurate, complete information) will increase the chances that the associated item will sell, it would be advantageous if innovative computer technology could be employed to enhance and standardize the quality of listings.

BRIEF DESCRIPTION OF THE FIGURES

The accompanying drawings are incorporated herein and form a part of the specification.

FIGS. 2A-2I collectively illustrate example screenshots generated by a computer system using artificial intelligence (AI) and machine learning (ML) technologies for the intelligent creation of consistently high quality listings for selling FSOs on an ecommerce site, according to a first embodiment.

FIGS. 5A-5D illustrate an example operational flow diagram of a computer system that uses AI and ML technologies for the intelligent creation of consistently high quality listings for selling FSOs on an ecommerce site, as well as sample embodiments of the AI and ML technologies, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, article of manufacture, method and/or computer program product embodiments, and/or combinations and sub-combinations thereof, for using computer technology to automate the creation of consistently high quality listings for selling "for sale objects" (FSO) on an ecommerce site. In some embodiments, the computer technology employs artificial intelligence (AI) and machine learning (ML) computing techniques, algorithms, methods, modules, components, software and/or other technology, as described herein.

FSOs may be any item, product, object, article, thing, piece, component, sub-component, combination, merchandise, inventory, and/or service that a user wishes to sell via an ecommerce site. When selling items on the ecommerce site, the user is sometimes called a "seller." When buying items on the ecommerce site, the user is sometimes called a "buyer." It is noted that a given user can be, at different times, a buyer, a seller, or a buyer and a seller.

Figure 1:
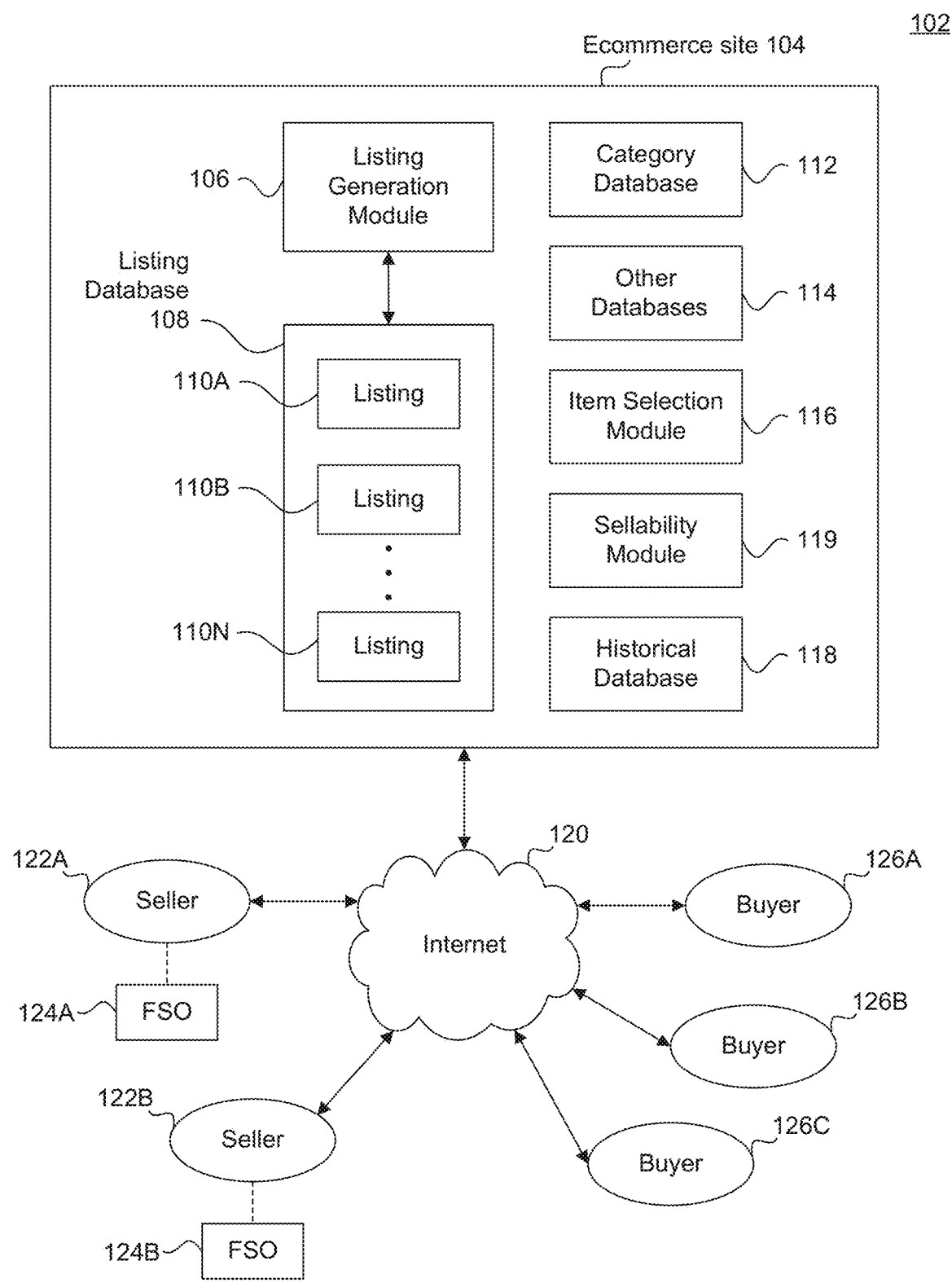
FIG. 1 illustrates a block diagram of a computing environment that includes an ecommerce site where users can buy and sell items and services, where such items/services are sometimes called herein "for sale objects" (FSO), according to some embodiments.

FIG. 1 illustrates a block diagram of a computing environment 102 that includes an ecommerce site 104 where sellers 122 can sell their FSOs 124, and buyers 126 can browse, search and buy the FSOs 124, according to some embodiments. The sellers 122 and buyers 126 can access the ecommerce site 104 via the Internet 120 or any other network or communication medium, standard, protocol or technology.

The ecommerce site 104 may include a listing database 108 that stores a plurality of listings 110. The listings 110 may be created by sellers 122 to sell their respective FSOs 124 on the ecommerce site 104. Traditionally, sellers 122 were required to create their listings 110 manually, and listings 110 varied widely in quality.

But according to this disclosure, sellers 122 may interact with a listing generation module 106 and item selection module 116 to automatically create listings 110 that are accurate, complete and of consistently high quality.

The FSOs 124 may each be associated with a category, such as smartphone, APPLE MACBOOK, garden tool, men's belt, motorcycle, office desk, woman's purse, and comic books, to name just some examples. These categories are stored in a category database 112. Other information regarding FSOs 124 (such as make, model, brand, size, color, features, condition, age, etc.) that may be used to create listings 110 may be stored in other databases 114.

Each of the listings 110 may have a sellability score that was generated by a sellability module 119. Sellability score is a measure of how likely a given FSO 124 will sell on the ecommerce site 104. For example, the sellability score for a given FSO 124 may be a number between 0 and 1, with the number indicating how likely the FSO 124 will sell on the ecommerce site 104 within a given period of time.

Information that the sellability module 119 may use in generating the sellability score for a given FSO 124 can include information associated with the images in the associated listing 110, such as but not limited to the number of image(s), the quality of the image(s), etc.

Other information that the sellability module 119 may use in generating the sellability score can include a price associated with the FSO 124 (that is, the price that the FSO 124 is being offered for sale). For example, the sellability module 119 may compare the price to the Manufacturer's Suggested Retail Price (MSRP) of items similar to the FSO 124 in determining sellability score.

Additional information that the sellability module 119 may use in generating the sellability score can include description information in the listing 110 associated with the FSO 124.

Other information that the sellability module 119 may use in generating the sellability score can include the features associated with the FSO 124. Example features may include, but are not limited to, category, brand, make, model, manufacturer, configuration, customization, color, serial number, condition indicators (e.g., poor, used, like new, new), time to sale, geographic location, etc.

The sellability module 119 may also consider other information when generating the sellability score for a FSO 124, such as (but not limited to) information associated with the seller 122 of the FSO 124.

For a given listing 110, the sellability module 119 may generate a first sellability score when the listing 110 is created, and a second sellability score when the listing 110 sells. The first sellability score may be based on the offer price, for example, and the second sellability score may be based on the final purchase price, as well as other information that was obtained by monitoring the listing 110 while active (that is, prior to selling) on the ecommerce site 104. Such other information may include how long the listing 110 took to sell, the number of views of the listing 110, the number of offers, the number of different buyers 126 who viewed the listing 110 and/or made offers, how often the seller 122 modified the listing 110, etc.

Sellability scores are further described in U.S. patent application Ser. No. 16/288,158 titled "Determining Sellability Score And Cancellability Score," filed Feb. 28, 2019, which is herein incorporated by reference in its entirety.

The ecommerce site 104 may include a database of historical information 118. The historical information 118 may store information pertaining to listings 110 that sold or did not sell, listings 110 that sold for the highest prices, listings 110 that sold in the shortest amounts of time, listings with the highest sellability scores (as determined by the sellability module 119), the original price and the sale price, description of the associated FSOs 124 (such as make, model, brand, size, color, manufacturer, damage, year, etc.), the number of views of each listing 110, the offers for each listing 110, as well as any other information included in the original listings 110 or collected by the ecommerce site 104 while the listings 110 were active and being monitored on the ecommerce site 104 (such as the second sellability scores described above).

FIGS. 2A-2I collectively illustrate example screenshots generated by a computer system using machine learning technology (such as the listing generation module 106 and the item selection module 116) for the intelligent creation of consistently high quality listings 110 for selling FSOs 124 on the ecommerce site 104, according to a first embodiment.

Figure 2B:
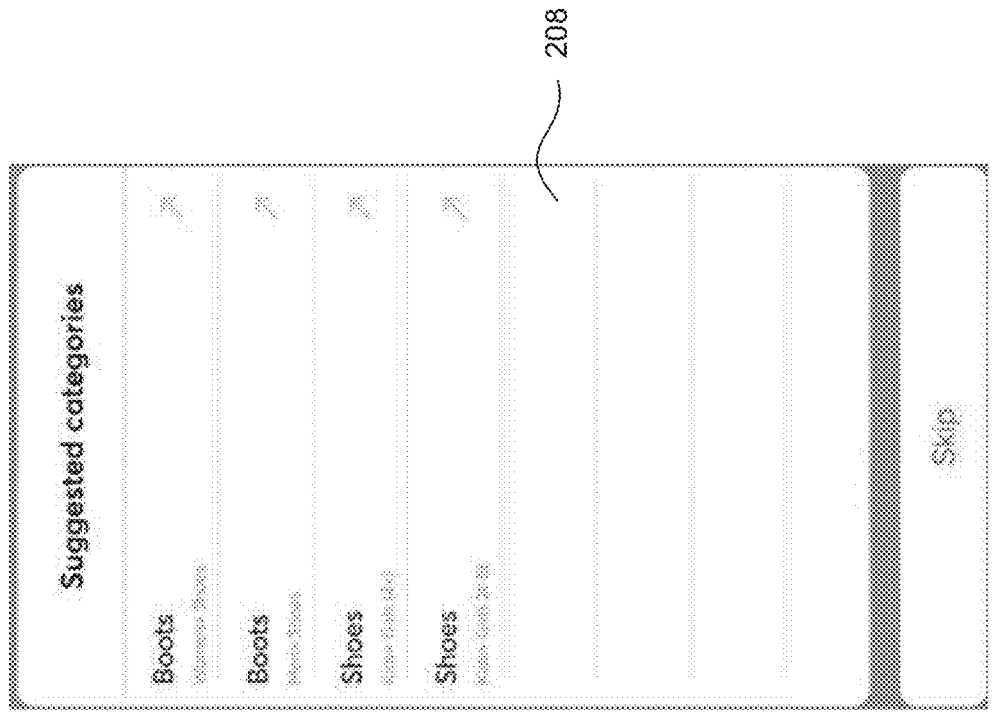
Figure 2A:
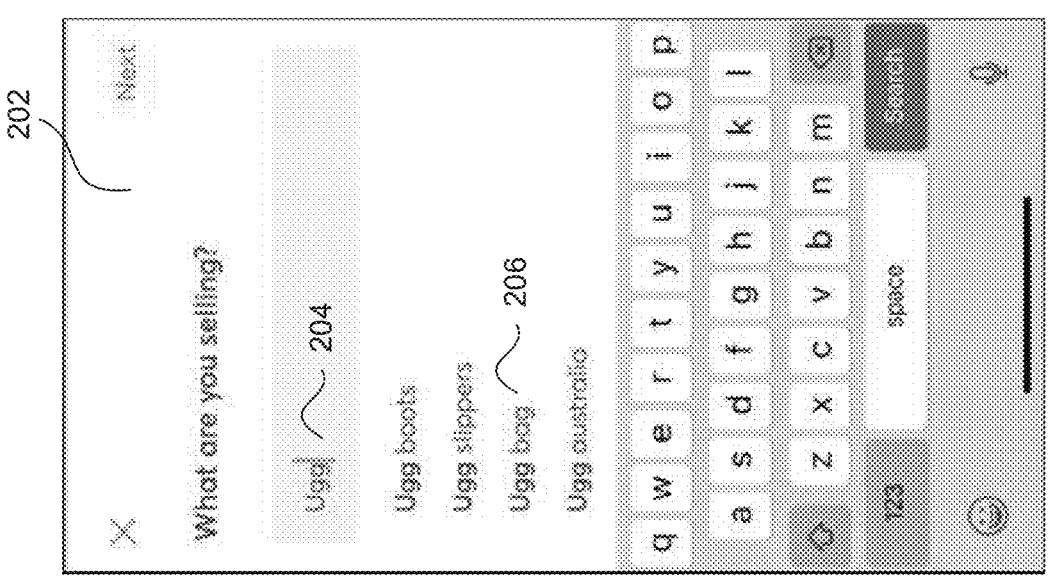

FIG. 2A illustrates screen shot 202, where a seller 122 may provide a short title 204 (that is, keywords) of the FSO 124 he wishes to sell. The listing generation module 106 may use the short title 204 to search the category database 112 and/or the other databases 114 to identify possible products and/or product categories that identify the FSO 124, which are displayed as 206. The seller 122 may select one of the items from this list 206. Assume, for purposes of example, that the seller 122 selected "Ugg boots."

The listing generation module 106 (and/or the item selection module 116) may use the seller 122's selection to identify categories to suggest to the seller 122. These are possible categories of the FSO 124 that the seller 122 wishes to sell. The listing generation module 106 may identify categories by conducting a search of the category database 112 using the seller 122's selection. However, such a keyword search by itself may have limited accuracy. Accordingly, in some embodiments, the listing generation module 106 may also or alternatively use artificial intelligence (AI) and machine learning (ML) to predict and suggest categories to the seller 122 based on his selection. For example, the listing generation module 106 may predict categories based on the seller 122's past search history and/or listings 110 (current and past), the search history and/or listings 110 of users who are similar to seller 122, historical information relating to the "Ugg" 204 title input in the screen shot 202 of FIG. 2A, as well as any number of other factors. The operation(s) of predicting and suggesting categories may also include using NER (Named Entity Recognition) to predict/parse the category from the string of text input by the user. NER recognition is based on a learning algorithm that takes tagged inputs as a golden set and extrapolates language. The listing generation module 106 may also use NER technology to predict other product attributes such as brand, color, and size.

The categories identified by the listing generation module 106 are displayed in an example screen shot 208 shown in FIG. 2B. The seller 122 may then select one of these categories. Or, if none of the displayed categories is appropriate for the FSO 124, then the seller 122 may type in a category. The seller 122's action here (that is, selecting one of the displayed, predicted categories or typing in another category) is provided to the listing generation module 106 and/or the item selection module 116, as ML feedback to train and enhance the category selection process, so that predictions of categories are more accurate in the future.

Assume for purposes of example that the seller 122 selects "Boots>Women>Shoes." Once again, the listing generation module 106 (and/or the item selection module 116) may use the seller 122's selection to predict sub-categories of the FSO 124 to suggest to the seller 122. These sub-categories are displayed in a list 210 in FIG. 2C. The operation here as to predicting sub-categories is similar to that associated with FIG. 2B as described above.

Figure 2D:
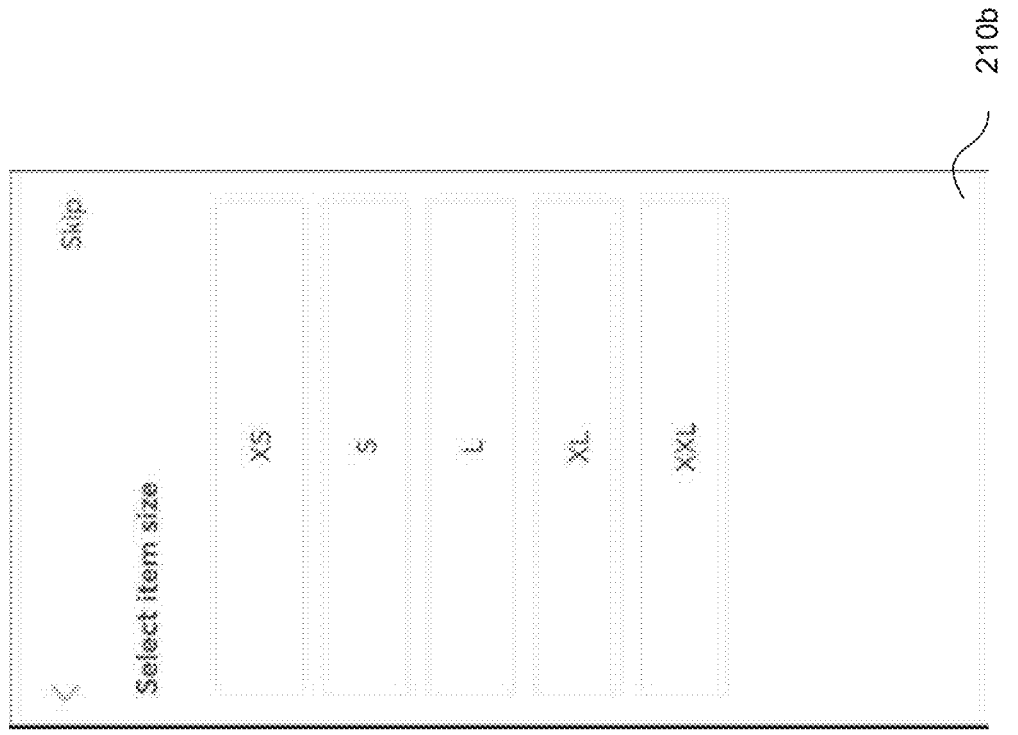
Figure 2C:

Assume for purposes of example that the seller 122 selects "Boots." Based on the seller 122's selection, other questions may be posed to the seller 122. These questions may be selected based on the user's selection, as some questions may be pertinent for some sub-categories but not for others. For the seller 122's selection of "Boots," for example, the listing generation module 106 may request size information as shown in FIG. 2D. Furthermore, based on the seller 122's selection of "Boots," the listing generation module 106 may further request information about the condition of such an item, as shown in FIG. 2E. In both of these figures (FIGS. 2D and 2E), if the user does not wish to provide this information or feels it is not pertinent to this FSO, they may skip past such a screen by clicking on the "Skip" button at the top right right of screenshots 210 and 212 of, FIG. 2D, and FIG. 2E, respectively.

The further questions in 2D and 2E asked by the listing generation module 106 for various FSOs 124 may not be applicable in certain situations. For example, with respect to FIG. 2D, it would not be appropriate for the listing generation module 106 to request the size of the boots from the user if an FSO 124 is a one-size-fits-all product. Furthermore, it may not make sense to ask the user the condition of the item, as in FIG. 2E if, for example, the item is a single-use item.

The listing generation module may have such a category attribute (one-size vs. multiple sizes or single use vs. multiple uses) hard-coded for a specific category or sub-category of item in a database under databases 114. Alternately, if users for such items repeatedly click on the skip button under screenshots 210*a*/210*b* and 212, this action may be detected by the ML logic and then entered as an attribute under database 114 inductively (e.g., once a certain threshold of users clicking on a skip button is met). Still alternately, in a simple embodiment, if a simple threshold percentage of users click the skip button under FIG. 2D or 2E, then a category attribute entry regarding size or use can be made in a corresponding database 114 for such a category, where the making of the category attribute may be inferring that the reason the prompt is being skipped is that the product is of uniform size, multiple uses, etc.

Figure 2F:
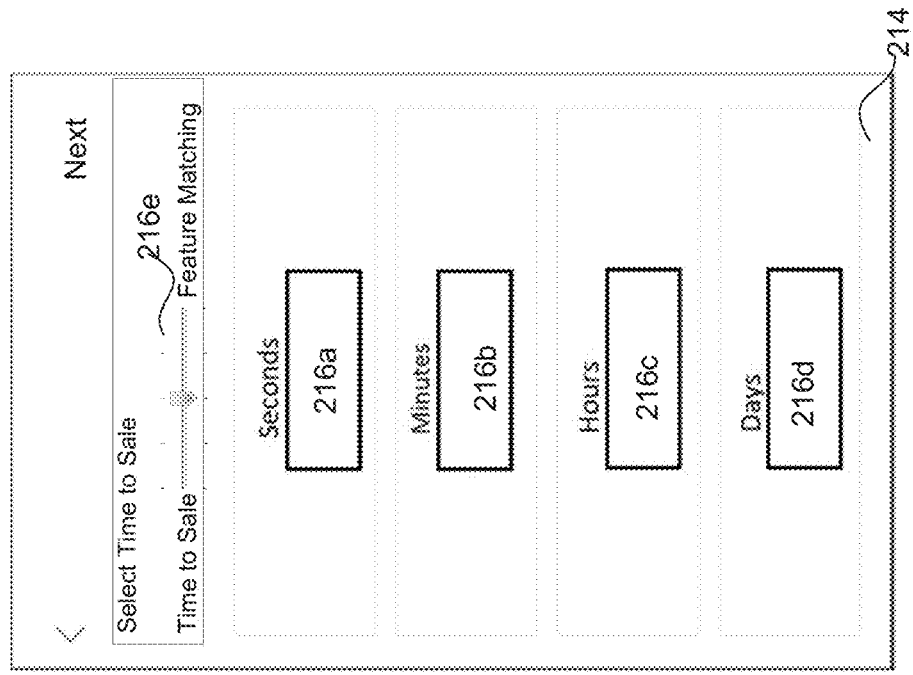
Figure 2E:
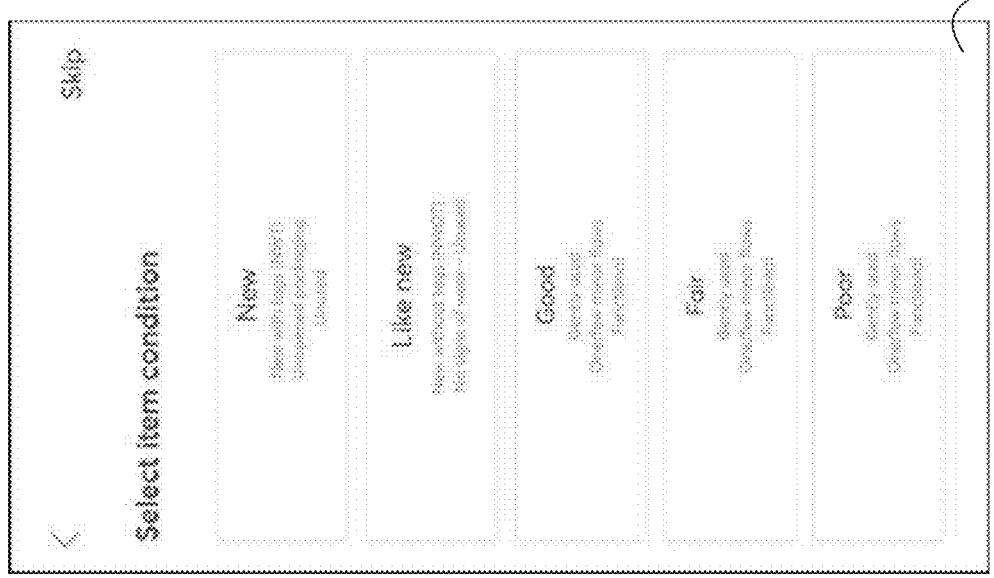

The listing generation module 106 may proceed to display screen shot 214 in FIG. 2F. Here, the listing generation module 106 may request from the user a time to sale. As will be explained later, the user may utilize a slider 216*e* to place importance on Time to Sale, or Feature Matching, as their situation may demand. Feature-matching calculates an optimum time to sale based on similarly listed items under the same or similar categories, condition, brand, demand, price sold, etc. In a situation where the user wants to emphasize more on time to sale (they want to offload inventory immediately), they may not care so much about making sure that the items match the category/brand/demand/price sold exactly, as opposed to selling the item quickly. On the other hand, where time is no issue, the user may be flexible about time to sale and only care about selling in a manner similar to those products which match the features of the device to be sold. Either case represents an endpoint on the slider 216*e*, and a user can easily drag the slider to emphasize either feature-matching, or time to sale, as their need may be.

This action sends weights to an aggregate support vector machine (SVM) classifier which will be described in the context of FIGS. 5A-5D, which reduces the data available to a certain number of data points based on the user's emphasis on both time to sale and feature matching, as decided by the slider 216*e*. The data points, as described above, come from similar listings 110 currently active in the ecommerce site 104 in listings database 108, and/or sold listings 110 stored in the historical database 118. These data points as an aggregate are reduced by the aggregate SVM classifier to a focused set of sold listings 110 or on sale listings 110 depending on user preferences.

These focused listings are then collectively averaged with regards to time to sale, and the time to sale accordingly is displayed in boxes 216*a*-216*d* with respect to only those historical listings in database 118 that are part of the ultimately reduced data set (only sold items have a definite time to sale). The average listing price of these points can also be determined, but this aspect can be determined with respect to not only the listings 110 in the historical database 118, but also the listings 110 that are on-sale in the database 108, as current listings still have a sale price (although it is subject to change by a user).

The user may choose to accept such a default time to sale in FIG. 2F, in which case they may click the "Next" button at the top right of screenshot 214. However, if they find the time to be unsuitable for any reason, they may want to change the default time. In this case they can edit the time in boxes 216*a* as desired, and then click on the "Next" button at the top right of screenshot 214. The change in time from the default time is sent as feedback to the ensemble SVM classifier. If the user leaves no entry in the boxes, the default time is used.

The next screen is shown in screenshot 218 of FIG. 2G. In an embodiment, the features in the feature matching process are weighted equally. However, the user can alter the weights of the features in the feature matching process, which are used in an ensemble classifier that will be described later with regards to FIGS. 5A-5D. For example, if the user wants to emphasize category because he or she may know that data from similar products and brands is more valuable to the user for determining a prospective time to sale or sale price of their product, they may change the weightings accordingly. In an embodiment, if the user historically has not sold enough of a product category (e.g., it makes lower than a predetermined threshold, such as 10% of their sales), then the default value for Similarity to User Profile 220*a* may be 0. In this case, the user per the category emphasis described above may rank Category 220*b* as "3," which is higher than Condition 220*c* and Demand 220*d* ("2"), which are in turn higher than Price Sold 220*e* ("1"), which in turn is higher than Similarity to User Profile ("0"). This may result in Category 220*b* receiving a weight of 0.444, whereas Condition 220*c* and Demand 220*d* receive a weight of 0.222 each, and Price Sold 220*e* receives a weight of 0.111, making for a total of approximately 1 (the weights always must add up to 1).

These weights are then sent to an ensemble classifier based on user ranking (or default values if the user chooses not to rank them). As will be described, the output of the ensemble classifier results in an aggregate feature matching score for each sold or on-sale listing 110 in the database 108 and 118. The feature matching score is then fed as an input into the aggregate SVM classifier described above, and ultimately a reduced set of points are determined, per user preferences set in slider 216*e*.

To proceed, the user may click the next button at the top right of screenshot 218, or may click the top left to go back to the previous screen in FIG. 2F. Once the user proceeds, the screenshot 222 of FIG. 2H is shown. Here, the listing generation module 106 may suggest a price 224 to the seller 122 for pricing the seller 122's FSO 124. By default, the suggested price 224 may be an average of the ultimately reduced set of points described above (including listings 110 in the historical database 118 as well as currently on-sale listings 110 in the listings database 108), is shown as default. The user is able to edit the field 224 and write their own item price as desired. The listing generation module 106 may also provide a list 226 of similar items that have recently sold on the ecommerce site 104. Again, these similar items are provided from the ultimately reduced set of points described above, wherein a predetermined number of listings out of this ultimately reduced set, that are sold and therefore in the historical database 118, may be chosen at random to show a representative range.

Within the feature matching process, which will be described later, price prediction could also include external data sources for Manufacturer's Suggested Retail Price (MSRP), as well as predictive models about the change in the value of such items over time. Further information regarding automatically determining pricing for the FSO 124 is provided in U.S. application titled "Inventory Ingestion and Pricing System," Ser. No. 16/288,199, filed Feb. 28, 2019, which is herein incorporated by reference in its entirety.

The seller 122 may accept the suggested price 224 provided in 222 of FIG. 2H, by clicking the "Next" button at the upper right of the screenshot 218. Alternately, the seller may enter a new price by, for example, selecting the region of the suggested price 224 and typing in a new price in the same region of the user interface shown in screen shot 222. The seller 122's action here (that is, selecting the suggested price 224 or entering a new price) is provided to the listing generation module 106 and/or the item selection module 116, as ML feedback to the ensemble SVM classifier to train and enhance the price generation process, so that price generation is more accurate in the future.

The listing generation module 106 will monitor this listing 110 as to whether or not it sells, how long it takes to sell, the listing price versus the actual sell price, etc., and provide this information as ML feedback to further train and enhance the price generation process to better match a prospective user's future needs.

Figure 2I:
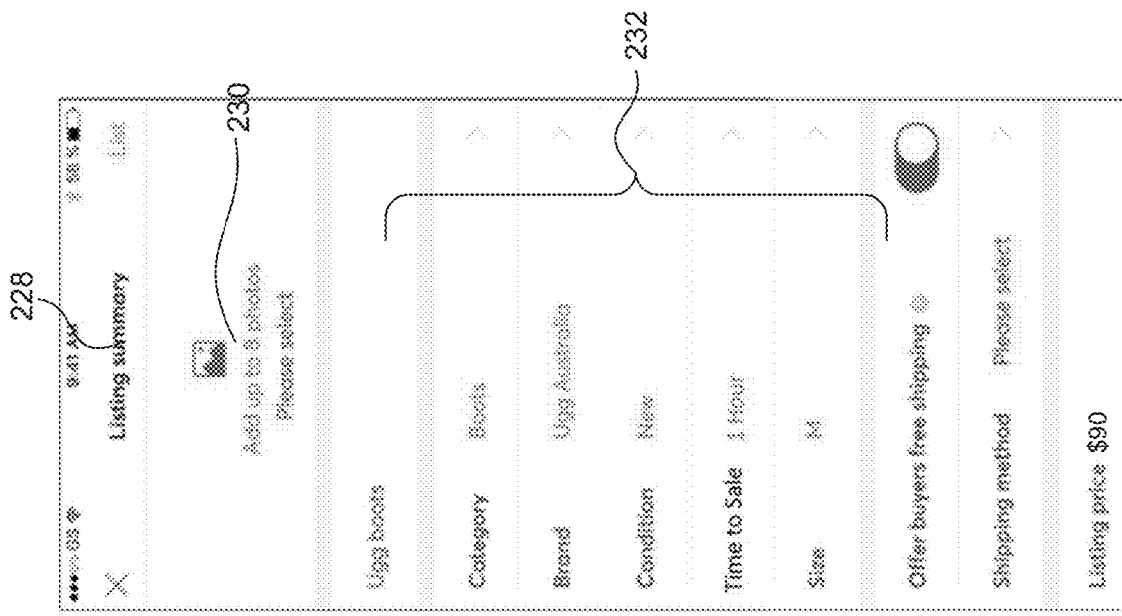

Finally, the listing generation module 106 may generate a listing 110 for the FSO 124, based on the foregoing processing and information. An example listing 110 (shown as 228) is shown in FIG. 2I. The seller 122 may modify the listing 228, such as inputting pictures 230 or editing any of the description fields 232.

It is noted that the first embodiment of FIGS. 2A-2I requires the seller 122 to manually select the category as well as other information. This requirement may be a burden on some sellers 122 who are inexperienced with creating listings 110 or who are not familiar with the FSO 124 they wish to sell. A second embodiment shown in FIGS. 3A-3E addresses this issue. The feature matching process, time to sale process, and slider 216e of FIGS. 2A-2I, may also be implemented in the process of FIGS. 3A-3E.

Figure 3B:
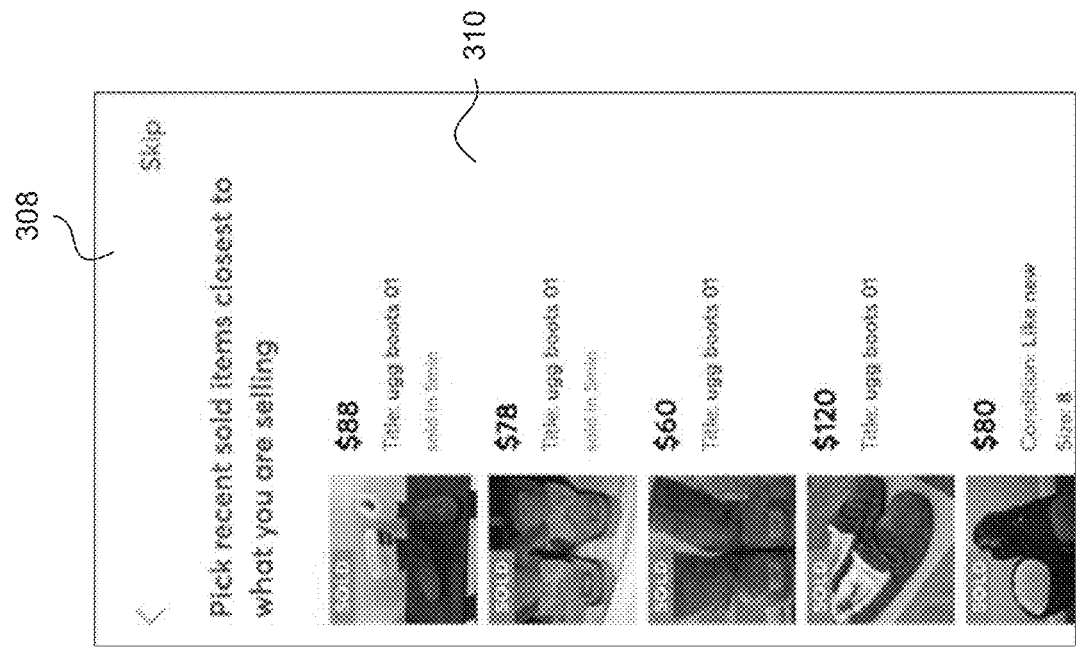
FIGS. 3A-3E collectively illustrate example screenshots generated by a computer system using AI and ML technologies for the intelligent creation of consistently high quality listings for selling FSOs on an ecommerce site, according to a second embodiment.
Figure 3A:
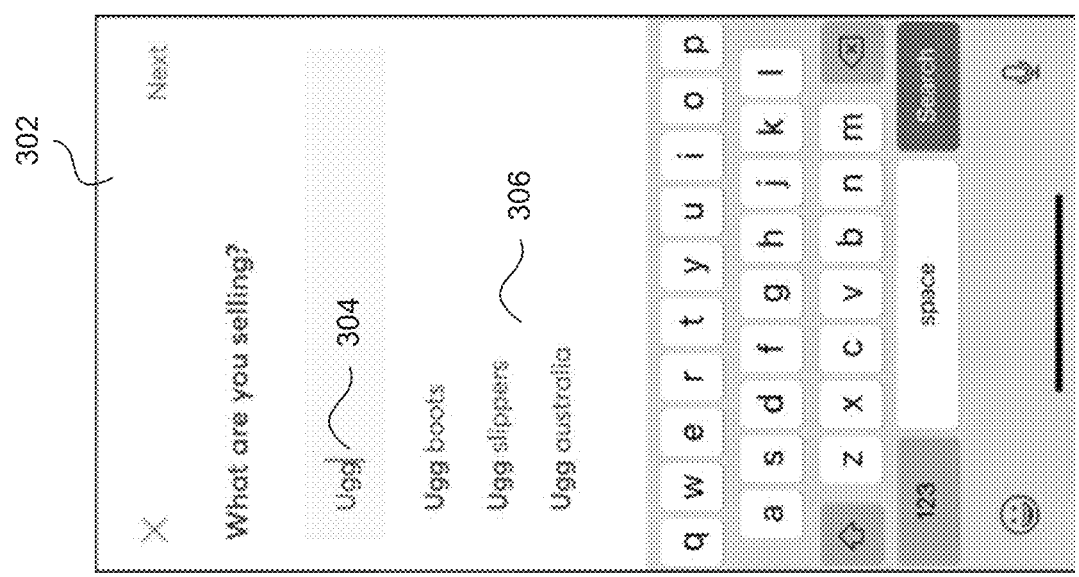

FIG. 3A illustrates screen shot 302, where a seller 122 may provide a short title 304 of the FSO 124 he wishes to sell. The listing generation module 106 may use the title 304 to search the category database 112 and/or the other databases 114 to predict possible products and/or product categories of the FSO 124, which are displayed as 306. The seller 122 may select one of the items from this list 206. Assume, for purposes of example, that the seller 122 selected "Ugg boots."

In the process described above with respect to FIGS. 2A-2I, the seller 122 was then required to select a category (FIG. 2B) and sub-category (FIG. 2C) for the FSO 124. But in the process of FIGS. 3A-3E, the listing generation module 106 and/or the item selection module 116 uses AI and ML to predict and determine one or more items 310 to present to the seller 122. In this case, after the screenshot 302, the time to sale and feature weighting screens of FIGS. 2F and 2G may be shown in the same manner to the seller, and based on the data input in these screens, as with the process of FIGS. 2A-2I, the data of all listings 110 that are on-sale within database 108 or historical listings 110 in database 118 that were sold may be narrowed down to an ultimately reduced data set. A predetermined number of listings 110 from this ultimately reduced data set, that are sold and therefore in the historical database 118, as shown in FIG. 2H, may be chosen at random to be shown to the seller in FIG. 3B. Such items 310 are ones that have been predicted to match or be similar to the seller 122's FSO 124, per individual seller preferences regarding time to sale v. feature matching, and the weights of different features in the feature matching.

The seller 122 may select one of these items 310, and the selected item is used as a template to automatically generate the listing 110 for the FSO 124. If none of the items 310 is similar to the FSO 124, then the seller 122 may key in information pertaining to the FSO 124 (to thereby manually create a listing 110). The seller 122's action here (that is, selecting one of the displayed items 310 or manually typing in information) is provided to the listing generation module 106 and/or the item selection module 116, as ML feedback to train and enhance the item selection process, so that predictions are more accurate in the future.

The listing generation module 106 may pose additional questions to the seller 122, such as a request to enter the condition of the FSO 124. This is shown in FIG. 3C.

Figure 3D:
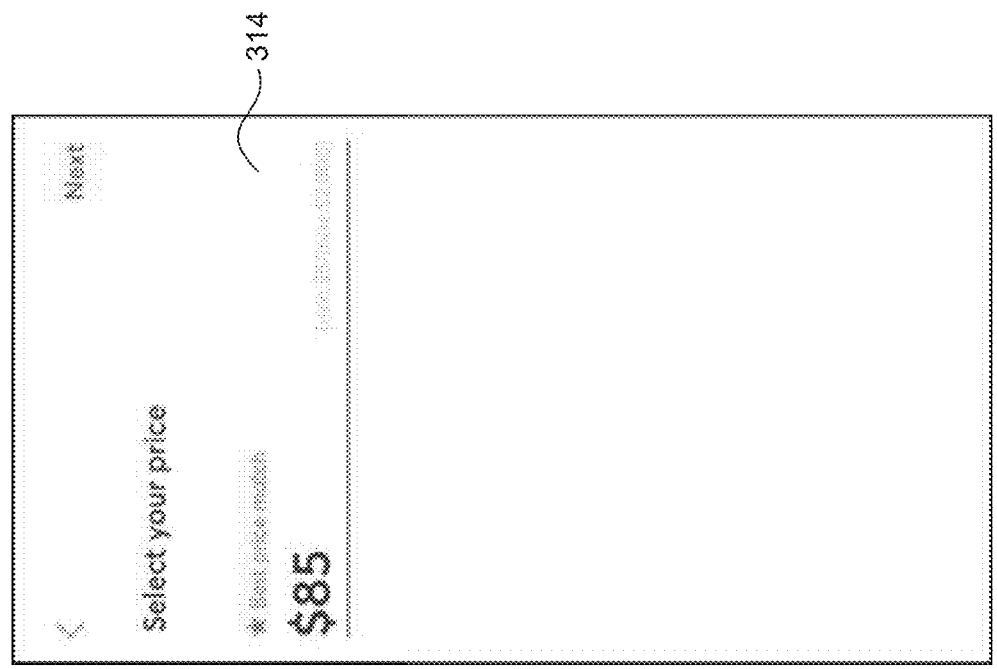
Figure 3C:
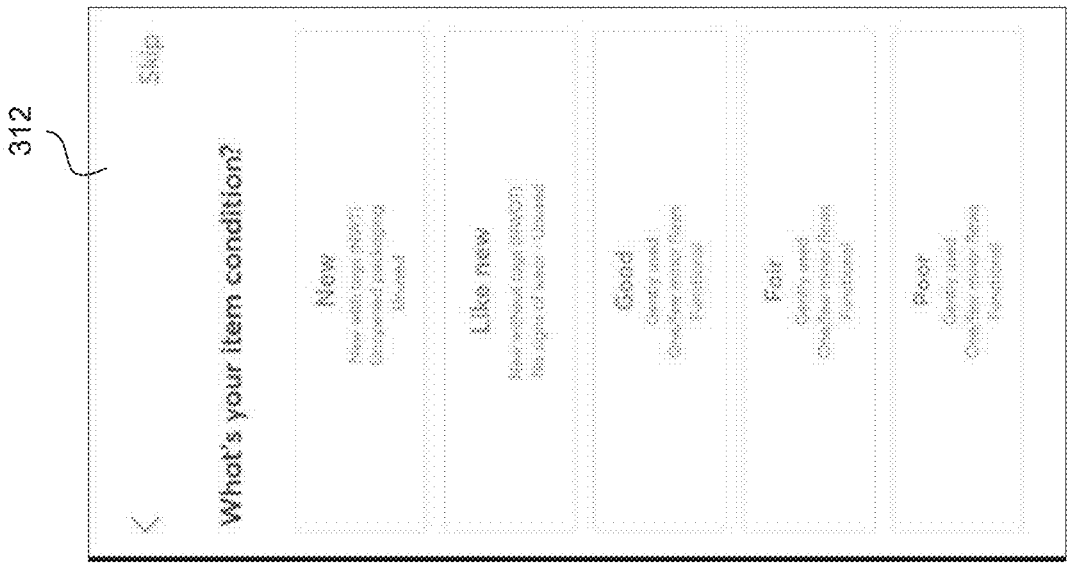

Thereafter, the listing generation module 106 may display the screen shot 314 shown in FIG. 3D. Here, the listing generation module 106 may generate and suggest a price to the seller 122 for pricing the FSO 124. As discussed above, the listing generation module 106 may generate the price based on the category, size, condition, and time for sale of the FSO 124, as well as the current price of similar listings 110 currently active in the ecommerce site 104, and/or the actual sell price of sold listings 110 stored in the historical database 118. Further information regarding automatically determining pricing for the FSO 124 is provided in U.S. application titled "Inventory Ingestion and Pricing System," Ser. No. 16/288,199, filed Feb. 28, 2019, which is herein incorporated by reference in its entirety.

The seller 122 may accept the suggested price provided in 314, or enter a new price, in an analogous manner as described with respect to FIG. 2G above. The seller 122's action here (that is, selecting the suggested price or entering a new price) is provided to the listing generation module 106 and/or the item selection module 116, as ML feedback to train and enhance the price generation process, so that price generation is more accurate in the future.

Figure 3E:
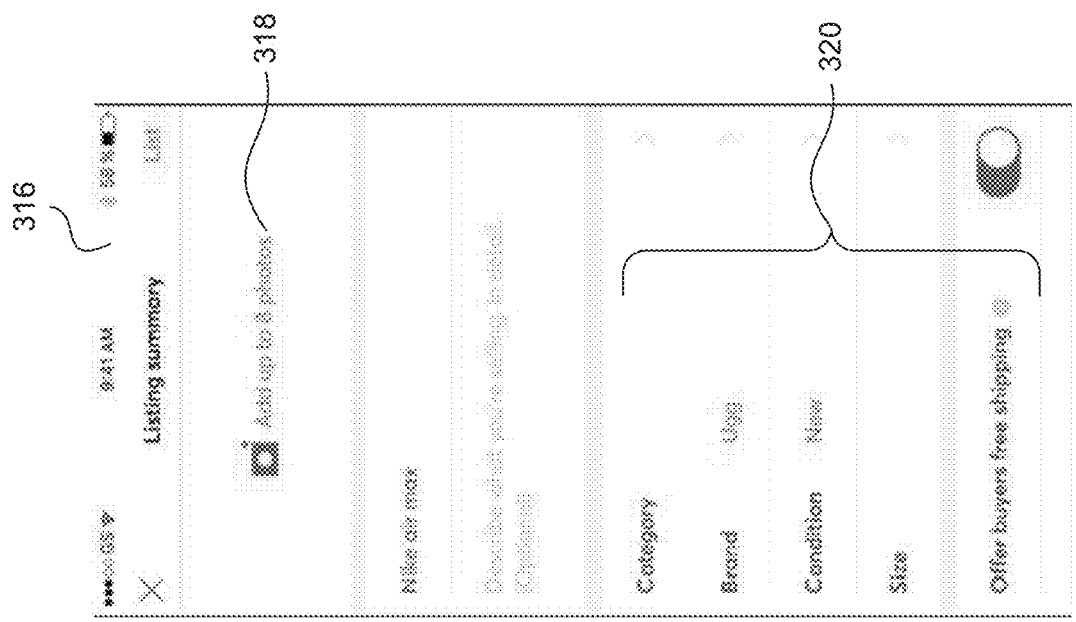

Finally, the listing generation module 106 may generate a listing 110 for the FSO 124, based on the foregoing processing and information. An example listing 110 (shown as 316) is shown in FIG. 3E. The listing generation module 106 generates the listing 316 using and importing information from an existing listing 110 corresponding to the selected item (from FIG. 3B) and the predicted price (from FIG. 3D), and/or the condition of the FSO 124 (from FIG. 3C) as well as the time to sale (which may be asked in a manner similar to that of FIG. 2F in the embodiments of FIG. 3) which can be asked to the user. In this manner, the listing generation module 106 has automatically generated a listing 110 that is complete, accurate and of consistently high quality.

The listing generation module 106 will monitor this listing 316 as to whether or not it sells, how long it takes to sell, the listing price versus the actual sell price, etc., and provide this information as ML feedback to further train and enhance the item selection engine and process, and/or the automatic pricing selection engine and process.

Figure 4A:
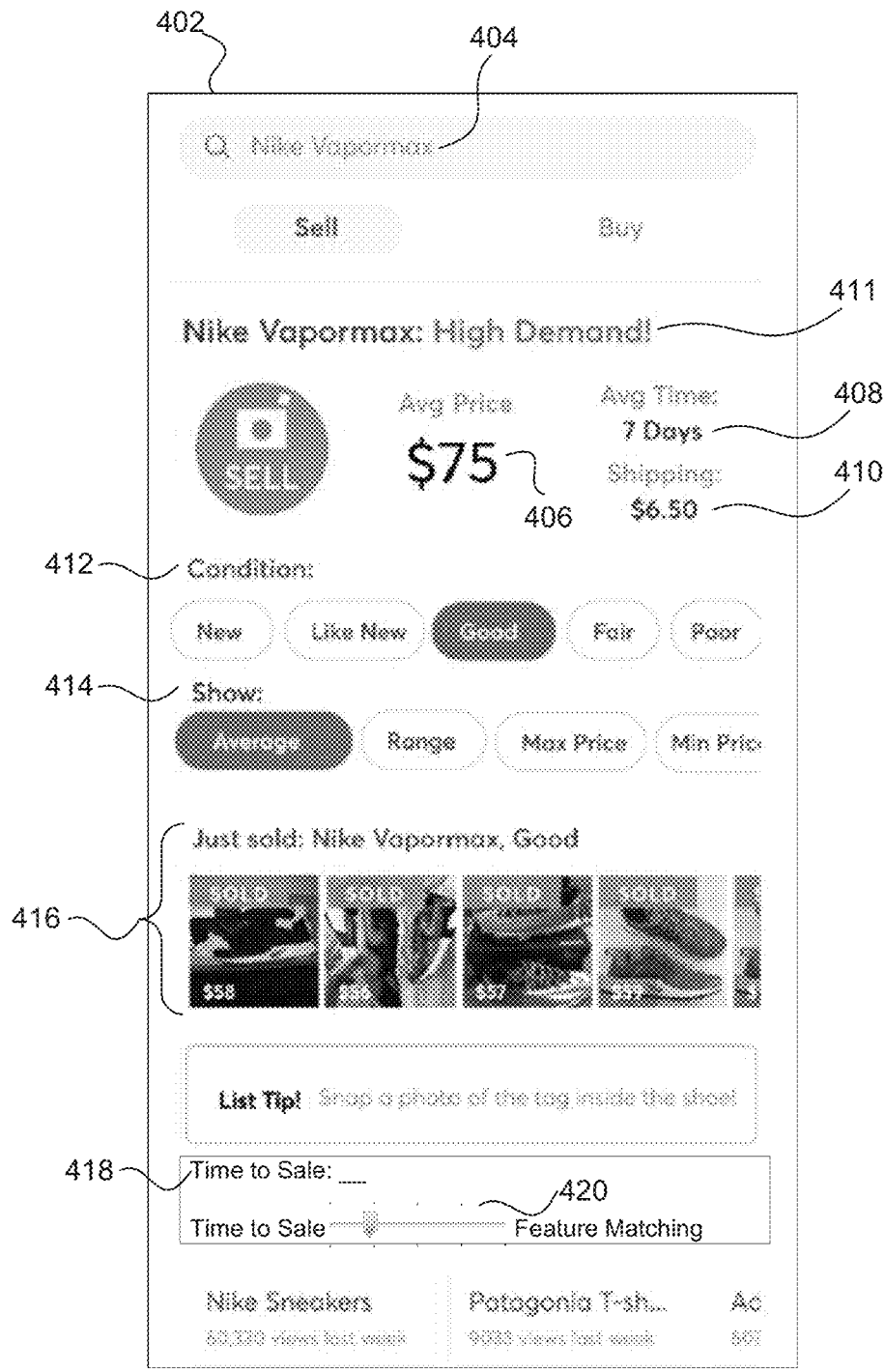
FIGS. 4A and 4B represent an alternative use case for the technologies illustrated in FIGS. 1, 2A-2I and/or 3A-3E, according to some embodiments.
Figure 4B:
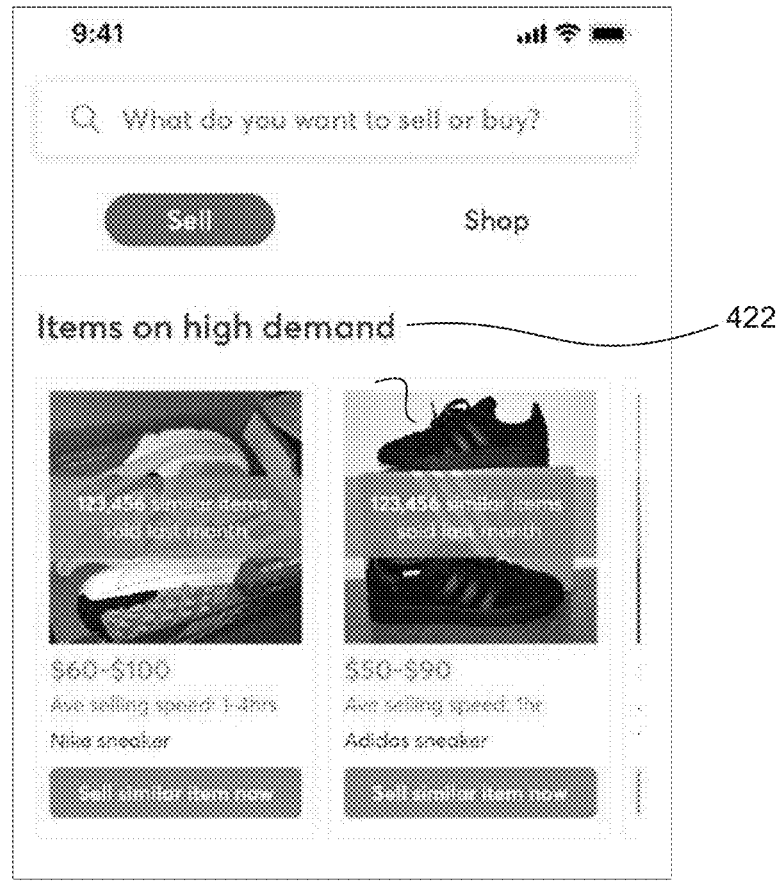

FIGS. 4A and 4B represent an alternative use case for the technologies illustrated in FIGS. 1, 2A-2I and/or 3A-3E, according to some embodiments. This use case enables a seller 122 to determine whether to list a FSO 124 for sale on the ecommerce site 104.

In a screen shot 402 shown in FIG. 4A, a seller 122 can provide a short title 404 for a FSO 124 she is considering selling. Using the processing and functions described above, the listing generation module 106 and/or item selection module 116 may identify similar items in current and/or sold listings 110. The listing generation module 106 may display an average price 406 of those listings 110 to the seller 122. For sold listings 110, the listing generation module 106 may also display the average selling time 408 and the actual shipping costs 410.

The listing generation module 106 may also indicate the predicted demand 411 of this item on the ecommerce site 104 (such as high demand, medium demand, low demand, etc.). The listing generation module 106 may predict the demand level based on how many similar items are currently for sale (unsold) on the ecommerce site 104, how fast sold listings 110 in the historical database 118 sold, the sellability scores of similar items (that is, the first sellability scores for active listings 110, and the second sellability scores for sold listings 110), search histories of users (that is, whether users are searching for this item), etc. Other factors involved with demand prediction may include any of: existing number of listings, average STR (sell through rate) of the item, number of users searching for such items, user engagement with such items (including views, likes, save searches), time it takes to sell such items, external market signals of demand (such as google trends), and/or price of such items relative to other similar ones in the marketplace.

The seller 122 may enter a condition 412 of his or her FSO 124 to focus the demand prediction 411 on just items of that condition 412. The seller 122 can also enter a time to sale in box 418 as an optional input. The time to sale in box 418 may take the form of another pop up prompt which mirrors the input boxes of FIG. 2F, wherein a default time may be input in the boxes in the same way (a default weighting of features for feature matching may be used; alternately, if "Feature Matching" is clicked on the slider 418, a pop-up prompt mirroring the input boxes of FIG. 2G may appear, enabling the user to input custom weighting of the feature rankings). If entered, this input can focus the demand prediction 411 on items to be sold within such a time range and based on custom feature matching weights, in the same manner of FIGS. 2A-2I and FIGS. 3A-3E, resulting in an ultimately reduced data set from an aggregate SVM classifier, wherein the demand of all of these data points (including historical listings 110 in database 118 as on-sale listings 110 have not been sold yet and are therefore difficult to adjudge demand for) may be averaged, resulting in a score which falls under the category of low demand, medium demand, or high demand, as will be explained. Other components, can also be altered based on such an optional input 418, wherein similar items sold, shown in area 416, may only be narrowed to have sold times that correspond to the time to sale desired in 418, and are chosen in the same manner as described above with respect to FIGS. 2H and 3B. The average price 406 may also be changed accordingly to reflect these similar items. The listing generation module 106 may display items 416 that are predicted to be similar to the FSO 124, that are in the condition 412 selected by the seller 122, and that recently sold. The seller 122 may focus this list of items 416 based on price range 414, time to sale 418, etc.

In a similar manner, the listing generation module 106 may identify items that are in high demand on the ecommerce site 104 (irrespective of any user search), and display a list 422 of those high demand items to users. This is shown in FIG. 4B.

FIG. 5 illustrates a operational flow diagram for a method 502 for the intelligent creation of consistently high quality listings for selling FSOs on an ecommerce site, according to some embodiments. Method 502 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 502 shall be described with reference to FIGS. 1, 2A-2I, 3A-3E and 4A-4B. However, method 502 is not limited to those example embodiments.

In 504, a user (such as a seller 122) may enter a keyword (KW). For example, the seller 122 may enter a short title such as in FIG. 2A, 3A or 4A. The keyword may describe a FSO 124 the seller 122 wishes to sell, or is considering to sell.

In 506, the listing generation module 106 and/or the item selection module 116 may generate predictions to identify the FSO 124. For example, the listing generation module 106 may generate predictions of the category and/or product of the FSO 124. In some embodiments, the listing generation module 106 will generate a prediction of demand of the FSO 124; this is shown in FIG. 4A. Such operation is described above.

Figure 5A:
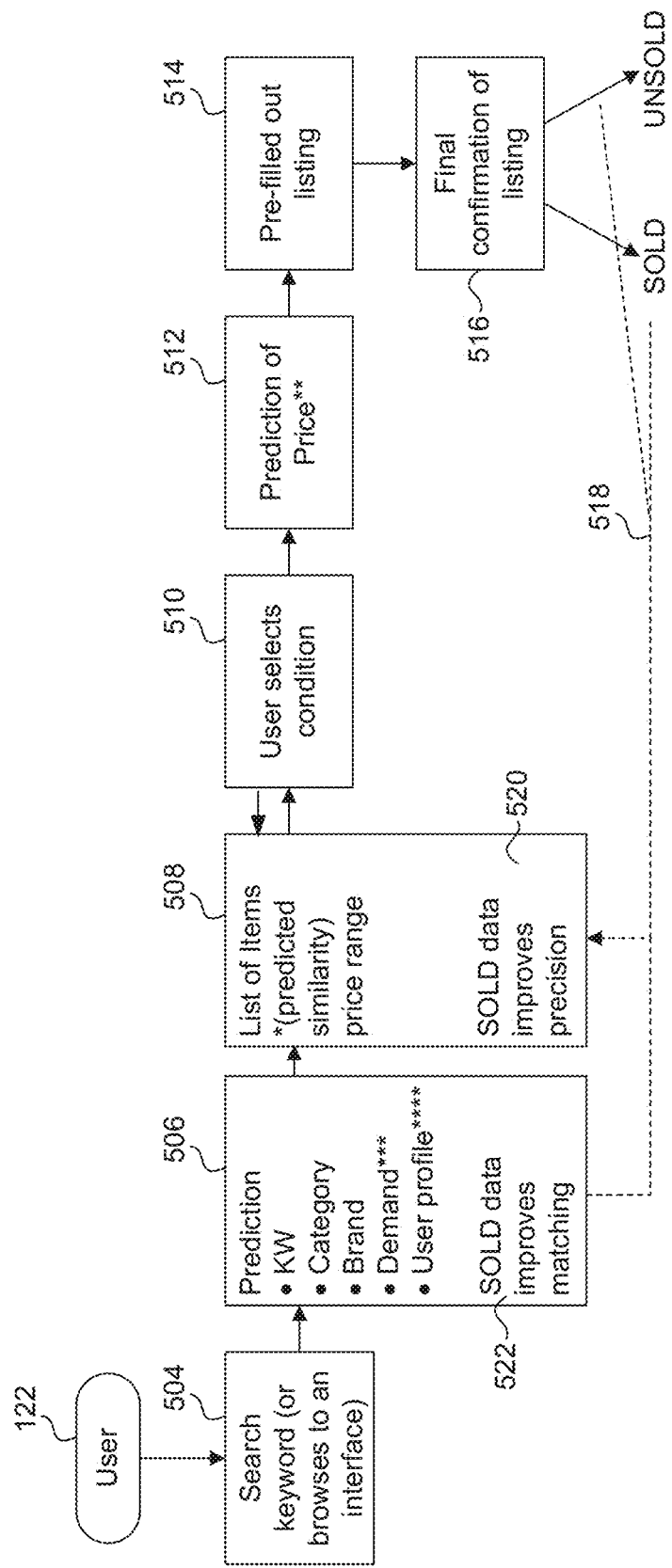
Figure 5B:
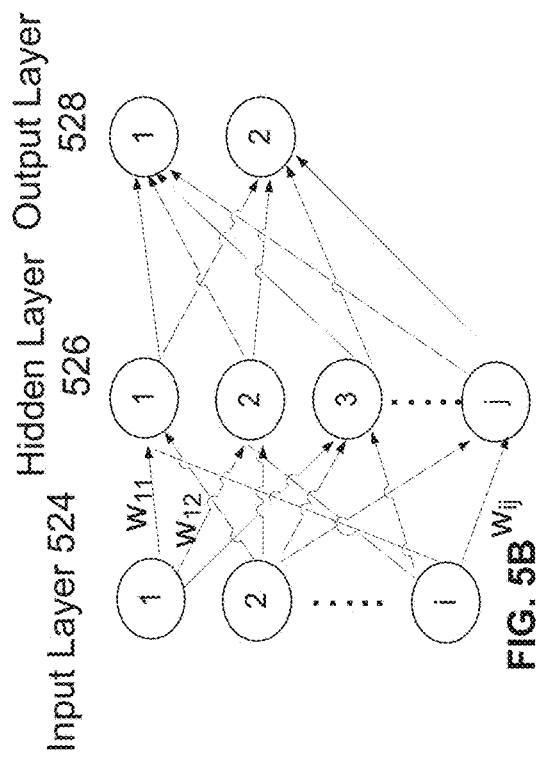

The module used to generate such predictions will herein be described. In an embodiment such a module may be a neural network with hidden layers and backpropagation as shown in FIG. 5B. The inputs in this case would be the keyword or keywords that the user is typing into a prompt (e.g. the prompt 204 in FIG. 2A or 304 in FIG. 3A). The neural network may be used as a machine learning classifier for these inputs to designate a potential category or categories of products. By using such a classification technique, it may be possible to create a system of nodes with weights. This system of nodes with weights may be used to give a reliable prediction of the category or categories the user's input belongs to. The different components of the neural network model shown in FIG. 5B will herein be explained, according to some embodiments. The input layer 524 contains nodes 1 to i, which represent inputs into the model. Each of these nodes corresponds to a different aspect of the string entered. In particular, the user's string, as inputted in 204, 304, etc., is first tokenized into words, and the tokenized words are stemmed. Training data may be used (where the category is known), where full sentence descriptions of the product may be transformed. Such a transformation may tokenize each word in sentence descriptions of a known category, create word stems, etc. After enough training data is used, there may be a collective library of word stems, some of which are associated with only one category, some associated with multiple categories, etc., such that when an input string in 204 or 304 is parsed apart, where one input node may correspond to each word, these nodes can be compared to the library of word stems associated with each category.

For example, if Ugg Boots is a company headquartered in Australia, the stem 'Aus' may be in the library of word stems array associated with the category "Ugg Boots." Thus if the user enters "Wearable contraption from Australia" as the input string 204/304, node 1 of the input layer 524 may represent the word stem "Wear", node 2 may represent "contraption", node 3 may represent "from," and node 4 may represent the word stem "Aus." These nodes may then be compared to the word stems from the training library (called "bag of words"), wherein nodes 1 through 3 maybe assigned the value 0 if they do not match up with any word stems in the bag of words, and node 4 may be assigned the value 1 if it does match up with a word stem in the bag of words (in this example it matches 'Aus' from above). In practical terms, the input is parsed through and correlated with a series of 0's and 1's where 1's correspond to words that are in the bag of words.

Through repeated rounds of the neural network being trained with training data, each stem may have a different weight $w_{ij}$ associated with the stem going to the next layer, and eventually to the output layer 528. This is because some words in the bag of words may have an association with particular companies and categories and may be more important than others. For example, the word "from" or other prepositions may be deemed to be less important than word stems like "Aus" which signal a headquarter location of a company. Output layer 528 may include two nodes as an example, node 1 and node 2, representing two categories. Node 1 may correspond to a category of "Ugg Boots," node 2 may correspond to a category of "X Boots," and there may be multiple nodes in this manner.

Based on the inputs and weights from each node to the other ($w_{ij}$ as shown in FIG. 5B), the results of the output layer are tabulated, and the node (1 or 2) in the output layer with the greater result is outputted as the outcome of the predictive analysis. In this case, since 'Aus' may have a particular association with Ugg Boots (if Ugg Boots is headquartered there as in the hypothetical example described above), the weights from the input layer node 4 to the output layer node 1 may carry more weight than from the input layer node 4 to the output layer node 2. This is because "X Boots" may not have a headquarters in Australia, and thus the word stem association of "Aus" with training data comprising sentence descriptions about "X Boots" is not as strong.

In traversing from the input layer 524 to the output layer 528, there may also be several hidden layers 526 present. The number of hidden layers 526 may be preset at one or may be a plurality of layers. If the number of hidden layers 526 is one (such as shown in FIG. 5B), the number of neurons in the hidden layer may be calculated as the mean of the number of neurons in the input and output layers. This is derived from an empirically-based rule of thumb in ease of calculating weights across layers. According to an additional rule of thumb, in an embodiment to prevent overfitting, where the number of neurons in input layer 524 is $N_i$ and the number of neurons in the output layer is $N_o$, and the number of samples in the training data set of all word stems associated with categories is $N_s$, then the number of neurons $N_h$ in one hidden layer may be kept below $$N_h = \frac{N_s}{(\alpha * (N_i + N_o))}, \quad \text{(equation 1)}$$

where $\alpha$ is a scaling factor (typically ranging from 2-10). In this manner, the number of free parameters in the model may be limited to a small portion of the degrees of freedom in the training data, in order to prevent overfitting.

From the input layer, based on the weights from each node in the input layer 524 to the hidden layer 526 shown in FIG. 5B, there may be a sigmoidal transfer function in going from the input layer 524 to the hidden layer 526. Initially, the weights $w_{i,j}$ may be initialized to random values between 0 and 1. An input node word-stem that corresponds to a word stem in the bag of words may then be propagated according to these weights (forward-propagation), wherein the hidden layer 526 forms the first outputs for the neurons of the input layer 524. For example, inputs given as neuron 1 and 2 in the input layer 524 in the example above would be multiplied respectively by 0 because they do not correspond to a word stem in the bag of words.

By contrast, neuron 4 would be multiplied by weights $w_{41}$ and $w_{42}$, etc., until $w_{4j}$, respectively, and in the same manner these hidden layer nodes would be summed to form the output to the hidden layer 604A (e.g. node 1 in the hidden layer in the example above would be the sum of $w_{11}+w_{21}+w_{31}+w_{41}=w_{41}$ since only node 4 has a word stem in the bag of words). Then the node 1 at the hidden layer 526 may take this net value and transfer this activation value to see what the neuron output onwards to the output layer actually is. At each output layer (hidden layer 526 with respect to input layer 524, and output layer 528 with respect to hidden layer 526) transfer functions comprising the sigmoid activation function $$S(x) = \frac{1}{1+e^{-x}},$$

hyperbolic tangent function $$\tanh x = \frac{e^{2x} - 1}{e^{2x} + 1},$$

or smooth rectified linear unit (SmoothReLU) function $f(x) = \log(1+ex)$ may be used to transfer outputs.

In the example above, the output given from the input layer 524 to neuron 1 of the hidden layer 526 would be inputted as the activation value to be transferred at the hidden layer 526 to one of the transfer functions described above, and the output would form the value of neuron 1 of the hidden layer 526 to be given onward as input to the output layer 528, and multiplied by respective weights to the neurons 1 and 2 of the output layer. In this manner, full forward propagation of input nodes 1 through I in the input layer 524 may be achieved to the output layer 528.

Then, to conduct backpropagation, error is calculated between the expected outputs and the outputs forward propagated from the network. In training the neural network, k-fold cross validation, may be used, particularly when the data sets are small. For k-fold cross-validation, for example, there could be an aggregated set of sentence descriptions all input by the user that are known to be associated with Ugg Boots (Category 1) or X Boots (Category 2) with respect to different associated word stems for each group, comprising all the components described above. This set of sentence descriptions may be shuffled and split into a k number of groups (e.g., 5 groups if k is 5, each holding a particular number of results (Category 1/Category 2) and corresponding associated word stems). Then, for each unique group, the group can be held out as a test data set, with the remaining groups of aggregated sentence descriptions being used to train the classifier.

Finally, based on the training, the accuracy with respect to the test group can be evaluated. One group may be held for testing and the others may be used to train the model. In so training, a '1' value is reserved for neuron 1 and a '0' value is reserved for neuron 2 of the output layer 528 if the result is 'Ugg boots' for the category associated with the user input. Conversely a '0' value is reserved for neuron 1 and a '1' value is reserved for neuron 2 if the result is a 'X boots' for the category associated with user input. In this manner, error is calculated between the expected outputs of 1,0 so described, and the outputs actually forward propagated by the network (initially by random weights assigned as described above).

In addition, if the user enters their own category as described above, the new category may be included as a new output node with a '1' value, and the rest of the output nodes may receive a '0' value. To transfer the error, the error signal to propagate backwards through the network is given by error=(expected−output)*transfer_derivative(output), wherein transfer_derivative is the derivative of the transfer function used (sigmoid, hyperbolic, or SmoothReLU).

The error signal for a neuron in the hidden layer 526 is then calculated as the weighted error of each neuron in the output layer, according to the weights from the output layer to the neuron in the hidden layer 526. Similarly, the error signal from the hidden layer is then propagated back to the input layer 524. Once the errors are calculated for each neuron in the network via the back propagation method described, the errors are used to update the weights according to the formula new_weight=old_weight+learning_rate*error*input. Here, the old_weight variable is the previous given weight in the model, the learning_rate variable is a value from 0 to 1 that specifies how much to change the old weight to correct for the error, the error variable is the error calculated by the backpropagation procedure, and the input variable is the value of the input that caused the error.

Over time, this model can be developed to form a robust prediction analysis. As for a given input there are probably several potential output categories, the output layer 528 may consist of tens or even hundreds of nodes. Each output node in the end has a score from 0 to 1. The output node with the largest node is deemed to be the most likely category of product which the user's input (e.g. in field 204 or 304) may be associated with. Accordingly, the second-highest score would denote the second most likely category of product associated with the user's input, and so on. Following this logic, for example, the top 4 to 5 most likely categories associated with a user's input may be shown, e.g., in field 206 of FIG. 2A or field 306 of FIG. 3A, etc.

Once these categories are displayed, the user may or may not select a category. If the user does select a category, then a value of '1' is input into the output layer, and the other categories become '0', and this result is backpropagated as described above to adjust the weights of the hidden and input layer to make the model more robust for future processing. Then, if a category is picked by the user, the previous corresponding input string from field 204 or 304 is again input into a further neural network model similar to FIG. 5B, wherein this further neural network model may be specific only to a particular type of category.

Thus, for each category, there may be a further neural network model with a further bag of words, with particular word stems associated with particular features. For example "as-is" may be associated with a "fair" condition, "brand" (of brand new) may be associated with "like new" condition, etc. In this manner, using the same logic with the previous neural network, subcategories may be correlated to a user input, and used further in feature matching which will be described (this corresponds to the embodiment of FIG. 3 above, which instead of asking the user for conditions as in the embodiment of FIG. 2, deduces subcategories from the entered words).

Once the categories and subcategories are either chosen (or not chosen) by the user, the process may advance to block 508. In 508, the feature matching is conducted, according to FIG. 5C, the result of the feature matching is fed to the aggregate SVM classifier in FIG. 5D, and listings 110 in the historical database 118 or on-sale listings in the listings database 108, that are related to the category chosen by the user (or the most likely category if not chosen by the user) are narrowed down to an ultimately reduced set of listings. The listing generation module 106 may display the items (that is, the predicted items) from this process in 508. This is shown in FIGS. 2H, 3B, and 4A. The listing generation module 106 (working with the item selection module 116) may have selected these items for display based on their predicted match or similarity to the seller 122's FSO 124.

In 510, the seller 122 provides a condition of the FSO 124. This is shown in FIGS. 2E, 3C and 4A. The seller 122 may be asked to provide additional information (depending on the category of the FSO 124) in some embodiments, such as size, condition, or time-to-sale. An example of this is shown in FIG. 2D. Based on such a condition, the list of terms may be re-shown dynamically (at regular or irregular intervals) and thus a back and forth flow of data from 508 to 510 is shown.

Figure 5C:
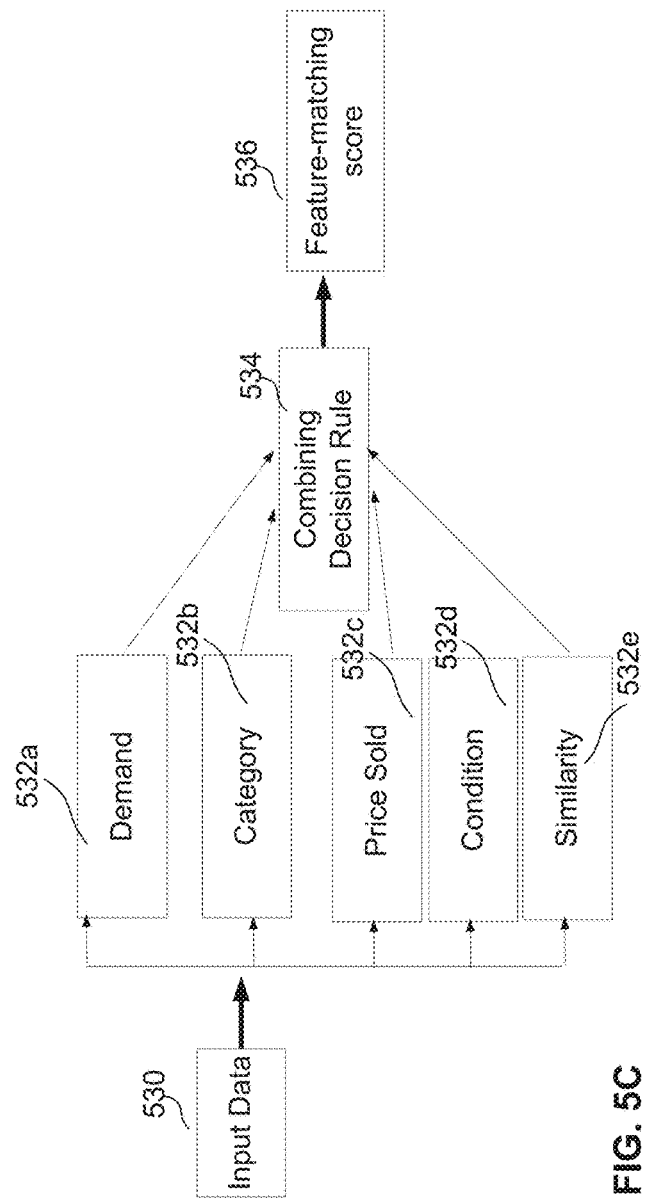

The feature-matching process will be described, according to an embodiment, when the seller has finished providing conditions of the FSO 124 including a condition of the product, category of the product, and a preference of time to sale vs. feature matching using e.g., slider 216e of FIG. 2F or slider 418 of FIG. 4A. In this case, an ensemble classifier of FIG. 5C is used on every point of input data 530. In this case, input data comprises listings 110 in the historical database 118 or on-sale listings in listings database 108. The entire output layer of category scores from the previous neural network model to determine category are used in 532b, wherein for a sample listing 110 in the input data 530, the scores based on the user input from field 204/304 may be correlated with the category of the sample listing 110.

For example, if the second most-likely score in the category-determining neural network as described above has an output value of 0.8, and a sample listing 110 belongs to the second-most likely category, then the value of the sample listing in node 532b is 0.8. For Demand 532a, this value is the output of another neural network of the type described in FIG. 5B. In particular, nodes in the input layer 524 for such a neural network model to determine demand include how many similar items are currently for sale (unsold) on the ecommerce site 104 (e.g., of the same category as the sample listing 110), how fast sold listings 110 in the historical database 118 of the same category as the sample listing sold, the sellability scores of items in the same category as the sample listing 110 (that is, the first sellability scores for active listings 110, and the second sellability scores for sold listings 110), frequency of the item of the sample listing in search histories of users of ecommerce site 104 (that is, whether users are searching for this item), etc.

Each of these input nodes, may be represented proportionately, as a value from 0 to 1. Other factors involved with demand prediction may include external market signals of demand (such as google trends), and/or price of such items relative to other similar ones in the marketplace. There may be a single node 1 in the output layer 528, wherein a value of 0-0.333 in node 1 may indicate "Low Demand," a value of 0.333-0.666 may indicate "Medium Demand," and a value of 0.666-0.999 may indicate "High Demand."

In this manner, a numerical value from the output layer of this neural network may be determined for each listing 110 of the input data 530. After such a numerical value is determined, it may be compared to the average numerical value over all listings 110 in the input data 530 that are of the same category as the user-input in field 204 or 304 (either the category that the user chose, or the top-most likely category as determined by the neural network model that determines category as described above). In this manner, the proximity of a listing 110 to an average of the listings 110 of the same category as the user's to-be-prepared listing may be reported as a ratio in 532a. Such a ratio might be set equal to the absolute value of the demand score of listing 110 subtracted by the average of the demand score of listings 110 of the same category as the user-input in field 204/304, divided by the average of the demand score of listings 110 of the same category as the user-input in field 204/304.

In the same manner, the numerical value of the price sold may be determined for each listing 110 of the input data 530, by comparison to the average numerical value over all listings 110 in the input data 530 that are of the same category as the user-input in field 204 or 304 (by taking the absolute value of the difference between the price sold of the listing 110 and the average price sold of all listings 110 of the same category as the user input, and dividing this absolute value by the average price sold of all listings 110 of the same category as the user input).

The condition of 532d is assumed to be specified by the user for the purposes of this exemplary embodiment. That is the user has specified as depicted in FIG. 4A element 412 whether the condition is "New," "Like New," "Good," "Fair," or "Poor." In an embodiment this may be treated as a sliding scale. That is, the condition of a sample listing 110 of input data 530, for each sample listing in the input data 530, may be compared to the user-specified condition for the object to-be sold, along the sliding scale, and assessed a score accordingly.

For example, if a condition of a listing is the same along the sliding scale as the user-specified condition, it may receive a score of 1. If a condition of a listing is adjacent along the sliding scale (e.g. if the listing is 'Like New' or 'Fair' if the user-specified condition is 'Good' or vice versa), it may receive a score of 0.4. If a condition of a listing is separated by at least one condition along the sliding scale (e.g. if the listing is 'New' or 'Poor' if the user-specified condition is 'Good' or vice versa), it may receive a score of 0. These scores can be changed, but in general, a listing 110 condition closer to the user-specified condition on the sliding scale may receive a greater score than a listing 110 condition that is farther away.

As with the Demand 532a field in the ensemble classifier of FIG. 5C, the Similarity 532e field may also be a neural network model of the type shown in FIG. 5B. As mentioned above, it may first be assessed whether the user has sold at least a predetermined threshold percentage of the type of product of the category chosen by the user (or the top-most likely category as determined by the neural network model above in the case the user has not chosen a category).

For example, if the user has only previously sold 5% of a category of product that the user is now preparing a listing for, it may not be useful to compare listings 110 with this data, as such data is too little to be meaningful. If such a threshold is not surpassed, the value of 532e may be 0. If the threshold is passed, then demand and price sold (corresponding to input 532a and 532c) may be used in a neural network model for similarity 532e.

In this case, values are not calculated with respect to the average of all listings 110 in the same category as the one chosen by the user (or the top-most likely category determined by the previously described neural network model for category-determination if the user has not chosen a category). Instead, values for Demand 532a and Price Sold 532c are calculated with respect to the average of listings 110 in the same category as the one chosen by the user of the listings that the user has previously sold. One node, node 1, is used in the output layer 528 of such a neural network model, where a score of 0-1 is generated at the output layer. A score closer to 1 indicates high similarity whereas a score closer to 0 indicates low similarity.

Thus all elements 532a-532e may be generated. These elements may be weighted by a combining decision rule 534. For example, such a decision rule may incorporate custom weights given by a user that wants to prioritize certain features over others when generating an overall feature-matching score. By default, all elements 532a-532e (assuming the threshold percentage mentioned above is surpassed for 532e) may be weighted to be equal. Over time, if such a weightage is generating product listings that are not selling, as described above, the listing is monitored until it does sell (if it does), and a difference in these five metrics (e.g. if the final listing had a higher price sold, etc.) can be assessed, and the default weights tweaked accordingly (e.g., to increase the weightage of the price sold by default if a product's ability to sell is more sensitive to price than equal weightage).

The values of the fields 532a-532e are then multiplied by their respective weights, according to the combining decision rule 534, and the collective sum is designated as the feature matching score 536. Ideally, a first product listing 110 (in the historical database 118 or on-sale product listing in the database 108) that is closer to the product the user desires to sell in several features than another product listing 110, it should have a higher feature-matching score 536.

However, proximity of product is not the only concern for a seller. In particular, a seller's plans can be very time sensitive, and that is why the inclusion of sliders 216e and 418 are helpful in this regard. For example, the user can set the degree to which they prefer to minimize the time to sale at the cost of product proximity, or vice versa (preferring proximity of product listings even at the cost of long times to sale).

The helpfulness of this feature is illustrated with reference to an example in FIG. 5D. In particular, the feature-matching score, and the time to sale of each listing 110 present can be fed to a further aggregate support vector machine (SVM) classifier, which is illustrated in FIG. 5D. Both the feature-matching score and the time to sale for every listing 110 in the historical database 118 can be plotted in FIG. 5D. Then, the support vector machine (SVM) technique is used to determine the best hyperplane based on the user's preferences to narrow the listings 110 to an ultimately reduced set.

In particular, the hyperplane is determined by minimizing the difference between two classes. By default, the hyperplane may be set to line 538, which clearly splits apart Sub-Category 1 and Sub-Category 2. Following the example described above, the user may be looking to sell a pair of boots (category is boots), wherein sub-category 1 may be "Ugg Boots," and sub-category 2 may be "Nike Boots". When the slider is dragged all the way to the right (clear preference to feature-matching score), then line 538 would be the result of the classifier. However, if time for sale is important for the user, then the user is not capturing more data points where a sale occurred more quickly and is rather incorporating an entire cluster of sub-category 1 points with an excessively long time to sale, as shown on the right side of the Figure.

On the other hand, if the user drags the slider 216e or 418 (or analogous slider present in embodiments of FIG. 3) all the way to the left side, the hyperplane would be split at line 540. In this manner, the user incorporates a substantial number of points that capture a minimal time to sale, but there is a large feature-matching score variation in these points. Lines 542 and 544 show two situations in between, wherein 542 describes a situation where the slider might be dragged closer to "Time to Sale" and line 544 describes a situation where the slider might be dragged closer to "Feature-matching score."

In this case, line 544 might describe the best situation for the user, wherein the user can minimize the incorporation of data points with a large time to sale, while at the same time also minimizing a large spread in feature-matching score. Thus the user can freely manipulate the slider to target clusters of data which are uniquely suited to the users needs. In this case, by moving the slider and shifting the hyperplane determined by the SVM so as to target the cluster of points above the line 544, the user is able to not only minimize time to sale but also gather data for points that are in close proximity to the product being sold on the basis of feature-matching score.

In this case, these points would be averaged to determine average price, displayed e.g., in field 224 of FIG. 2H, and the average time to sale, which would be displayed in FIG. 2G. Thus by skewing the data to capture a beneficial cluster in both dimensions can enable the highest sale price while setting an optimal time to sale, resulting in the most efficient sale for the user.

Furthermore, in an embodiment, the items displayed in list 226 or list 416 may be the points that are closest to the line (e.g. line 544). In this manner as distance is minimized from the hyper plane, an optimal balance of feature matching and time to sale can be struck. For example, the 4 points closest to the line 544, representing listings 110 in the historical database 118 may be listed in list 226 or list 416 as the most relevant listings 110 for a viewer to see.

The hyperplane is illustrated in two-dimensions, but the same principle can be used in multiple dimensions. For example, in a 3-dimensional embodiment, demand may be used not in the ensemble classifier of FIG. 5C, but in a hyperplane. In this embodiment the feature matching score (without demand 532a), along with the result of demand 532a as a separate entity, and time to sale is fed to an aggregate SVM classifier. The user's preference according to sliders 216e and 418 may include an additional slider of "Demand" on one side, and "Feature Matching" on the other side, in the same manner as the slider between "Time to Sale and Feature Matching" shown in 216e.

Then, in this case, if the user cares more about whether a product will sell rather than how proximate it is to a product for which a listing is being created, and if the user also wants to minimize a time to sale, a hyperplane in 3-dimensions may be generated accordingly. This hyperplane would seek to be low on the axis corresponding to time to sale, high on the axis corresponding to demand, and high on the axis corresponding to feature-matching score. Thus an optimal cluster of points can again be targeted by the user, and the set of listings can accordingly be optimally reduced.

In 512, the listing generation module 106 may generate a price prediction for the FSO 124, in the manner described above, based on the ultimately reduced set of listings, and averaging the price of these listings. This is shown in FIGS. 2H, 3D, and 4A. The seller 122 may accept this suggested price, or enter a new price for the FSO 124.

In 514, the listing generation module 106 automatically generates and displays a completed listing 110 for the seller 122's FSO 124. Examples of this listing 110 are shown in FIGS. 2H and 3E. In other use case embodiments, the listing generation module 106 may display the information from the above steps in other formats, such as in FIG. 4A where the predicted demand 411 for the FSO 124 is displayed.

In 516, the seller 122 may accept the listing 110 that was generated by the listing generation module 106, or make any desired edits. At that point, the listing 110 is posted as active and available for purchase on the ecommerce site 104.

As indicated by 518, method 502 is a closed loop process. The listing generation module 106 may monitor the listing 110 as to whether it sells, does not sell, how long it takes to sell, whether it sells at the predicted price or lower, etc. This information is provided as ML feedback to further train and enhance the associated AI prediction processes and engines. This is indicated by 520 and 522. The sellability module 119 may also update the associated sellability scores (that is, the second sellability scores) with this information, as discussed above.

Example Computer System

Figure 6:
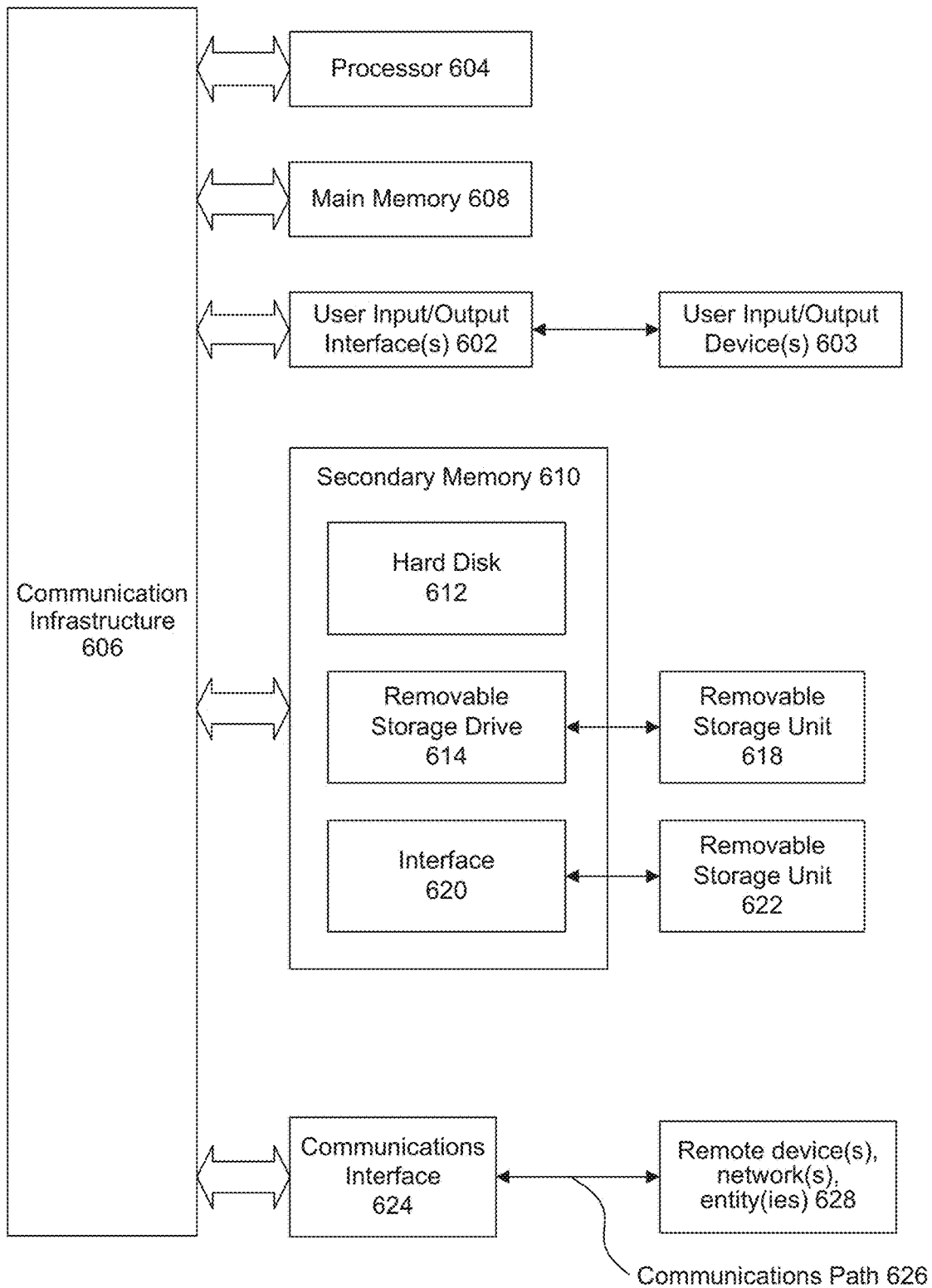
FIG. 6 illustrates an example computer system useful for implementing various embodiments.

Various embodiments and/or components therein can be implemented, for example, using one or more computer systems, such as computer system 600 shown in FIG. 6. Computer system 600 can be any computer or computing device capable of performing the functions described herein. For example, one or more computer systems 600 or portions thereof can be used to implement any of the embodiments described herein, and/or any combination or sub-combination thereof.

Computer system 600 includes one or more processors (also called central processing units, or CPUs), such as a processor 604. Processor 604 is connected to a communication infrastructure or bus 606.

One or more processors 604 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 can include one or more levels of cache. Main memory 608 has stored therein control logic (i.e., computer software) and/or data.

Computer system 600 can also include one or more secondary storage devices or memory 610. Secondary memory 610 can include, for example, a hard disk drive 612 and/or a removable storage device or drive 614. Removable storage drive 614 can be a floppy disk drive, a magnetic tape drive, a compact disk drive, an optical storage device, tape backup device, and/or any other storage device/drive.

Removable storage drive 614 can interact with a removable storage unit 618. Removable storage unit 618 includes a computer usable or readable storage device having stored thereon computer software (control logic) and/or data. Removable storage unit 618 can be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 can include other means, instrumentalities or other approaches for allowing computer programs and/or other instructions and/or data to be accessed by computer system 600. Such means, instrumentalities or other approaches can include, for example, a removable storage unit 622 and an interface 620. Examples of the removable storage unit 622 and the interface 620 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 can further include a communication or network interface 624. Communication interface 624 enables computer system 600 to communicate and interact with any combination of remote devices, remote networks, remote entities, etc. (individually and collectively referenced by reference number 628). For example, communication interface 624 can allow computer system 600 to communicate with remote devices 628 over communications path 626, which can be wired and/or wireless, and which can include any combination of LANs, WANs, the Internet, etc. Control logic and/or data can be transmitted to and from computer system 600 via communication path 626.

In some embodiments, a non-transitory, tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
receiving, by at least one processor, user input from a user related to a "for sale object" (FSO);
predicting, by the at least one processor, using a neural network machine learning classifier, a list of product categories that are likely to describe the FSO, wherein a neural network comprises an input layer including one or more nodes that represent an input into a model of the neural network, an output layer indicating the list of product categories, and one or more hidden layers between the input layer and the output layer, wherein one or more node weights are applied to the input to the model between the input layer and transfer to the one or more hidden layers;
receiving, by the at least one processor, the user input corresponding to a selection of one of the list of product categories;
displaying, on a user interface, a slider comprising a hyperplane adjustable by the user between a time-to-sale and a feature matching score;
receiving a preference input via the user interface displaying the slider;
generating, by the at least one processor, via a listing generation module and using artificial intelligence, a price for the FSO based on at least the selection, a condition of the FSO, and the preference input;
automatically generating, by the at least one processor, a listing for the FSO based on at least the selection, the generated price and the condition of the FSO;
monitoring the listing by the at least one processor; and
using, by the at least one processor, information from the monitoring as machine learning feedback to train and enhance predictions by the listing generation module.

2. The method of claim 1, the generating of the price for the FSO further comprising:

receiving, by the at least one processor, the user input comprising weights associated with features of the FSO including the selection and the condition of the FSO;

inputting features associated with the FSO, by the at least one processor into an ensemble classifier;

using, by the at least one processor, an output of the ensemble classifier to narrow listings in a historical database into an ultimately reduced set of listings;

determining, by the at least one processor, a price for the FSO, and a time to sale for the FSO, based on the ultimately reduced set of listings.

3. The method of claim 2, wherein the inputted features associated with the FSO in the ensemble classifier also include a demand, a price sold, and a similarity to previous products of the same product category as the selection.

4. The method of claim 3, wherein the inputted feature of the demand is predicted based on an output of the neural network machine learning classifier using similar items for sale, a time to sale for historical listings in the historical database, and frequency of search by users for the FSO as inputs.

5. The method of claim 4, wherein the inputted feature of the demand in the ensemble classifier has a numerical value that either corresponds to low demand, medium demand or high demand.

6. The method of claim 2, further comprising:
inputting, by the at least one processor, the output of the ensemble classifier as a feature-matching score into an aggregate support vector machine (SVM), and using, by the at least one processor, the SVM to separate historical listings in the historical database using a hyperplane.

7. The method of claim 1, wherein an adjustment of the slider in a direction of the feature matching score causes the listing generation module to calculate an optimum time to sell based on a similarity of the FSO to other similar products.

8. A system, comprising:
a memory; and
at least one processor coupled to the memory and configured to:
receive user input from a user related to a "for sale object" (FSO);
predict, using a neural network machine learning classifier, a list of product categories that are likely to describe the FSO, wherein a neural network comprises an input layer including one or more nodes that represent an input into a model of the neural network, an output layer indicating the list of product categories, and one or more hidden layers between the input layer and the output layer, wherein one or more node weights are applied to the input to the model between the input layer and transfer to the one or more hidden layers;
receive the user input corresponding to a selection of one of the list of product categories;
display, on a user interface, a slider comprising a hyperplane adjustable by the user between a time-to-sale and a feature matching score;
receive a preference input via the user interface displaying the slider;
generate, by a listing generation module and using artificial intelligence, a price for the FSO based on at least the selection, a condition of the FSO, and the preference input;
automatically generate a listing for the FSO based on at least the selection, the generated price and the condition of the FSO;
monitor the listing; and
use information from the monitoring as machine learning feedback to train and enhance predictions by the listing generation module.

9. The system of claim 8, wherein to generate the price for the FSO, the at least one processor is further configured to:
receive the user input comprising weights associated with features of the FSO including the selection and the condition of the FSO;
input features associated with the FSO, by the at least one processor, into an ensemble classifier;
use an output of the ensemble classifier to narrow listings in a historical database into an ultimately reduced set of listings;
determine a price for the FSO, and a time to sale for the FSO, based on the ultimately reduced set of listings.

10. The system of claim 9, wherein the inputted features associated with the FSO in the ensemble classifier also include a demand, a price sold, and a similarity to previous products of a same product category as the selection.

11. The system of claim 10, wherein the inputted feature of the demand is calculated predicted based on an output of the neural network machine learning classifier using similar items for sale, a time to sale for historical listings in the historical database, and frequency of search by users for the FSO as inputs.

12. The system of claim 11, wherein the inputted feature of the demand in the ensemble classifier has a numerical value that either corresponds to low demand, medium demand, or high demand.

13. The system of claim 9, wherein the at least one processor is further configured to: input the output of the ensemble classifier as a feature-matching score into an aggregate support vector machine (SVM), and using the SVM to separate historical listings in the historical database using a hyperplane.

14. A non-transitory computer-readable device having instructions stored thereon that, when executed by at least one computing device, cause the at least one computing device to perform operations comprising:
receiving user input from a user related to a "for sale object" (FSO);
predicting, using a neural network machine learning classifier, a list of product categories that are likely to describe the FSO, wherein a neural network comprises an input layer including one or more nodes that represent an input into a model of the neural network, an output layer indicating the list of product categories, and one or more hidden layers between the input layer and the output layer, wherein one or more node weights are applied to the input to the model between the input layer and transfer to the one or more hidden layers;
receiving the user input corresponding to a selection of one of the list of product categories;
displaying, on a user interface, a slider comprising a hyperplane adjustable by the user between a time-to-sale and a feature matching score;
receiving a preference input via the user interface displaying the slider;
generating, via a listing generation module and using artificial intelligence, a price for the FSO based on at least the selection, a condition of the FSO, and the preference input;
automatically generating a listing for the FSO based on at least the selection, the generated price and the condition of the FSO;
monitoring the listing; and using information from the monitoring as machine learning feedback to train and enhance predictions by the listing generation module.

15. The device of claim 14, wherein the generating of the price for the FSO based on the selection and the condition of the FSO further comprises:
   receiving the user input comprising weights associated with features of the FSO including the selection and the condition of the FSO;
   inputting features associated with the FSO into an ensemble classifier;
   using an output of the ensemble classifier to narrow listings in a historical database into an ultimately reduced set of listings;
   determining a price for the FSO, and a time to sale for the FSO, based on the ultimately reduced set of listings.

16. The device of claim 15, wherein the inputted features associated with the FSO in the ensemble classifier also include a demand, a price sold, and a similarity to previous products of the same product category as the selection.

17. The device of claim 16, wherein the inputted feature of the demand is predicted based on an output of the neural network machine learning classifier using similar items for sale, a time to sale for historical listings in the historical database, and frequency of search by users for the FSO as inputs.

18. The device of claim 15, the operations further comprising:
   inputting the output of the ensemble classifier as a feature-matching score into an aggregate support vector machine (SVM), and using the SVM to separate historical listings in the historical database using a hyperplane.

19. The device of claim 18, wherein the operations further comprise shifting the hyperplane by a user preference regarding the time to sale for the FSO.

* * * * *